(12) United States Patent
Zheng et al.

(10) Patent No.: US 12,523,231 B2
(45) Date of Patent: Jan. 13, 2026

(54) PORTABLE FAN, DRIVE CIRCUIT, HANDHELD FAN, AND NECK FAN

(71) Applicant: SHENZHEN JISU TECHNOLOGY CO., LTD, Shenzhen (CN)

(72) Inventors: Guanzheng Zheng, Shenzhen (CN); Jiahang Xie, Shenzhen (CN); Shuiyong Yuan, Shenzhen (CN); Xiangfu Li, Shenzhen (CN); Haijun Gao, Shenzhen (CN); Cheng Ye, Shenzhen (CN); Cunfu Huang, Shenzhen (CN); Weijie Zheng, Shenzhen (CN)

(73) Assignee: SHENZHEN JISU TECHNOLOGY CO., LTD, Shenzhen (CN)

(*) Notice: Subject to any disclaimer, the term of this patent is extended or adjusted under 35 U.S.C. 154(b) by 0 days.

(21) Appl. No.: 18/927,186

(22) Filed: Oct. 25, 2024

(65) Prior Publication Data

US 2025/0052250 A1 Feb. 13, 2025

Related U.S. Application Data

(63) Continuation-in-part of application No. PCT/CN2023/099539, filed on Jun. 9, 2023.

(30) Foreign Application Priority Data

May 11, 2022 (CN) .......................... 202221176136.4
Jun. 14, 2022 (CN) .......................... 202221486507.9
(Continued)

(51) Int. Cl.
*F04D 25/08* (2006.01)
*F04D 25/06* (2006.01)
(Continued)

(52) U.S. Cl.
CPC ....... *F04D 25/084* (2013.01); *F04D 25/0673* (2013.01); *F04D 25/0693* (2013.01);
(Continued)

(58) Field of Classification Search
CPC .............. F04D 25/084; F04D 25/0673; F04D 25/0693; F04D 27/00; F04D 29/0465; F04D 29/0467; F04D 29/048; H02K 11/33
See application file for complete search history.

(56) References Cited

U.S. PATENT DOCUMENTS 2,770,413 A 11/1956 Grantham et al.
4,152,094 A 5/1979 Honda et al.
(Continued)

FOREIGN PATENT DOCUMENTS

CN 86103286 A 1/1987
CN 2695693 Y 4/2005
(Continued)

OTHER PUBLICATIONS

International Search Report, International Application No. PCT/CN2023/099539, International mailed Sep. 11, 2023 (16 pages).
(Continued)

*Primary Examiner* — Zoheb S Imtiaz

(57) ABSTRACT

A portable fan includes: a fan and a power supply drive assembly electrically connected to the fan. The power supply drive assembly comprises a battery and a fan drive circuit electrically connected to the battery. The fan drive circuit includes a master control circuit; a three-phase drive circuit; and an inverted-phase electric potential detection circuit. The battery is configured to supply power to the fan drive circuit.

18 Claims, 18 Drawing Sheets

(30) Foreign Application Priority Data

| Date | | Application No. |
|---|---|---|
| Jul. 25, 2022 | (CN) | 202221950040.9 |
| Oct. 21, 2022 | (CN) | 202222795438.6 |
| Nov. 2, 2022 | (CN) | 202222918924.2 |
| Nov. 2, 2022 | (CN) | 202222928106.0 |
| Nov. 9, 2022 | (CN) | 202222989400.2 |
| Nov. 15, 2022 | (CN) | 202223038810.5 |
| Dec. 19, 2022 | (CN) | 202223413732.2 |
| Feb. 8, 2023 | (CN) | 202320231044.X |
| Feb. 16, 2023 | (CN) | 202320295274.2 |
| Apr. 17, 2023 | (CN) | 202320882604.8 |
| Apr. 17, 2023 | (CN) | 202320958823.X |

(51) Int. Cl.
 *F04D 27/00* (2006.01)
 *F04D 29/046* (2006.01)
 *F04D 29/048* (2006.01)
 *H02K 11/33* (2016.01)

(52) U.S. Cl.
 CPC ......... *F04D 27/00* (2013.01); *F04D 29/0465* (2013.01); *F04D 29/0467* (2013.01); *F04D 29/048* (2013.01); *H02K 11/33* (2016.01)

(56) References Cited

U.S. PATENT DOCUMENTS

| | | |
|---|---|---|
| 4,945,604 A | 8/1990 | Miner et al. |
| 6,244,818 B1 | 6/2001 | Chang |
| 6,320,286 B1 | 11/2001 | Ramarathnam |
| 6,547,540 B1 | 4/2003 | Horng et al. |
| 8,368,334 B2 | 2/2013 | Kern et al. |
| 8,522,780 B2 | 9/2013 | Devries et al. |
| 8,627,819 B2 | 1/2014 | Devries et al. |
| 10,304,324 B2 | 5/2019 | Smith et al. |
| 10,525,371 B1 | 1/2020 | Hsu |
| 11,566,628 B1 | 1/2023 | Liu |
| 2006/0144396 A1 | 7/2006 | DeVries et al. |
| 2006/0267435 A1 | 11/2006 | Lin et al. |
| 2008/0199159 A1 | 8/2008 | Lee |
| 2008/0203962 A1 | 8/2008 | Maeda et al. |
| 2012/0068649 A1 | 3/2012 | Krishnamoorthy et al. |
| 2012/0268047 A1 | 10/2012 | Suzuki et al. |
| 2012/0286715 A1* | 11/2012 | Nakajima ............... F24F 11/75 318/450 |
| 2014/0178209 A1 | 6/2014 | Smith et al. |
| 2015/0145444 A1 | 5/2015 | Reed et al. |
| 2015/0303842 A1* | 10/2015 | Takano ................. B25F 5/00 173/2 |
| 2016/0076547 A1 | 3/2016 | Chu et al. |
| 2016/0265540 A1 | 9/2016 | Tirone et al. |
| 2017/0021489 A1 | 1/2017 | Bylund et al. |
| 2017/0047834 A1 | 2/2017 | Chan |
| 2018/0187689 A1 | 7/2018 | Chen et al. |
| 2018/0223864 A1 | 8/2018 | Chou |
| 2018/0249873 A1† | 9/2018 | Yoshida |
| 2019/0351360 A1 | 11/2019 | Plotkin |
| 2020/0309152 A1* | 10/2020 | Sanford ............... F04D 29/601 |
| 2021/0006184 A1† | 1/2021 | Yamamoto |
| 2021/0219503 A1 | 7/2021 | Olvera et al. |
| 2021/0345751 A1 | 11/2021 | Nelson et al. |
| 2021/0355963 A1 | 11/2021 | Kang |
| 2023/0032935 A1 | 2/2023 | Bi et al. |
| 2023/0065201 A1* | 3/2023 | Takeda ................ H02K 11/33 |
| 2023/0120339 A1* | 4/2023 | Kim ................. F04D 29/601 415/213.1 |
| 2023/0400039 A1 | 12/2023 | Schubeler |
| 2024/0007010 A1* | 1/2024 | Hongyo ............... H02M 1/126 |
| 2024/0042867 A1* | 2/2024 | Hara ................. B60L 15/08 |
| 2024/0206692 A1 | 6/2024 | Gan |

FOREIGN PATENT DOCUMENTS

| | | | |
|---|---|---|---|
| CN | 102937117 A | | 2/2013 |
| CN | 103075359 A | | 5/2013 |
| CN | 103883546 A | | 6/2014 |
| CN | 103944555 A | | 7/2014 |
| CN | 104236000 A | | 12/2014 |
| CN | 204267337 U | | 4/2015 |
| CN | 104953900 A | | 9/2015 |
| CN | 105736470 A | | 7/2016 |
| CN | 205956020 U | | 2/2017 |
| CN | 206017193 U | | 3/2017 |
| CN | 106762727 A | | 5/2017 |
| CN | 107068512 A | | 8/2017 |
| CN | 206582149 U | | 10/2017 |
| CN | 207184202 | † | 4/2018 |
| CN | 207184202 U | | 4/2018 |
| CN | 108397411 A | | 8/2018 |
| CN | 109245410 A | | 1/2019 |
| CN | 208480746 U | | 2/2019 |
| CN | 109505783 A | | 3/2019 |
| CN | 109538516 A | | 3/2019 |
| CN | 109672250 A | | 4/2019 |
| CN | 208686628 U | | 4/2019 |
| CN | 209053814 U | | 7/2019 |
| CN | 110107522 A | | 8/2019 |
| CN | 209253814 U | | 8/2019 |
| CN | 110219819 A | | 9/2019 |
| CN | 110658950 A | | 1/2020 |
| CN | 210343807 U | | 4/2020 |
| CN | 111120384 A | | 5/2020 |
| CN | 210516802 | † | 5/2020 |
| CN | 210626539 U | | 5/2020 |
| CN | 111322260 A | | 6/2020 |
| CN | 111336122 A | | 6/2020 |
| CN | 211041267 U | | 7/2020 |
| CN | 211059041 U | | 7/2020 |
| CN | 211082341 U | | 7/2020 |
| CN | 211422955 U | | 9/2020 |
| CN | 112343840 A | | 2/2021 |
| CN | 212838507 U | | 3/2021 |
| CN | 212867982 U | | 4/2021 |
| CN | 212899070 U | | 4/2021 |
| CN | 212989932 U | | 4/2021 |
| CN | 213125881 U | | 5/2021 |
| CN | 213176121 U | | 5/2021 |
| CN | 213206043 U | | 5/2021 |
| CN | 213206068 U | | 5/2021 |
| CN | 213206069 U | | 5/2021 |
| CN | 213206107 U | | 5/2021 |
| CN | 213215779 U | | 5/2021 |
| CN | 112879337 A | | 6/2021 |
| CN | 112983867 A | | 6/2021 |
| CN | 113027794 A | | 6/2021 |
| CN | 213574721 U | | 6/2021 |
| CN | 113236590 A | | 8/2021 |
| CN | 213928829 U | | 8/2021 |
| CN | 213981287 U | | 8/2021 |
| CN | 213981304 U | | 8/2021 |
| CN | 214145972 U | | 9/2021 |
| CN | 214366833 U | | 10/2021 |
| CN | 214404069 U | | 10/2021 |
| CN | 214432479 U | | 10/2021 |
| CN | 214742197 | † | 11/2021 |
| CN | 214742197 U | | 11/2021 |
| CN | 214742262 U | | 11/2021 |
| CN | 215170878 | † | 12/2021 |
| CN | 215170978 | † | 12/2021 |
| CN | 215256893 U | | 12/2021 |
| CN | 215370289 U | | 12/2021 |
| CN | 215370290 U | | 12/2021 |
| CN | 114087218 A | | 2/2022 |
| CN | 215719696 U | | 2/2022 |
| CN | 215860873 U | | 2/2022 |
| CN | 114382716 A | | 4/2022 |
| CN | 216518757 U | | 5/2022 |
| CN | 216742067 U | | 6/2022 |
| CN | 216742072 U | | 6/2022 |
| CN | 216812235 U | | 6/2022 |

(56) References Cited

FOREIGN PATENT DOCUMENTS

| | | |
|---|---|---|
| CN | 216812236 U | 6/2022 |
| CN | 216842289 U | 6/2022 |
| CN | 217029352 U | 7/2022 |
| CN | 217029355 U | 7/2022 |
| CN | 217107504 U | 8/2022 |
| CN | 217950722 U | 12/2022 |
| CN | 218439839 U | 2/2023 |
| CN | 218439858 U | 2/2023 |
| CN | 218817072 U | 4/2023 |
| CN | 218817097 U | 4/2023 |
| CN | 218817245 U | 4/2023 |
| CN | 218817263 U | 4/2023 |
| CN | 219012915 U | 5/2023 |
| CN | 116352661 A | 6/2023 |
| CN | 219176615 U | 6/2023 |
| CN | 219672881 U | 9/2023 |
| CN | 220248387 U | 12/2023 |
| CN | 220248398 U | 12/2023 |
| CN | 220452240 U | 2/2024 |
| CN | 220452242 U | 2/2024 |
| CN | 220452243 U | 2/2024 |
| CN | 220452245 U | 2/2024 |
| CN | 220452247 U | 2/2024 |
| CN | 220539912 U | 2/2024 |
| CN | 220544885 U | 2/2024 |
| CN | 111322260 B | 6/2024 |
| JP | 1974019957 U | 2/1974 |
| JP | 1987007997 A | 1/1987 |
| JP | 1988235694 A | 9/1988 |
| JP | 1988191289 U | 12/1988 |
| JP | 2007221470 A | 8/2007 |
| JP | 2009191627 A | 8/2009 |
| JP | 2013051757 A | 3/2013 |
| JP | 2014123950 A | 7/2014 |
| JP | 2014535133 A | 12/2014 |
| JP | 5747632 B2 | 7/2015 |
| JP | 2016133001 A | 7/2016 |
| JP | 2018010836 A | 1/2018 |
| JP | 3225662 U | 3/2020 |
| JP | 3226224 U | 5/2020 |
| JP | 3230942 U | 3/2021 |
| JP | 3231822 U | 4/2021 |
| JP | 2021069157 A | 4/2021 |
| JP | 6950932 B2 | 10/2021 |
| JP | 2021179209 A | 11/2021 |
| JP | 2022020093 A | 2/2022 |
| JP | 2022515310 A | 2/2022 |
| KR | 101070662 B1 | 10/2011 |
| KR | 20180061094 A | 6/2018 |
| KR | 20200104187 A | 9/2020 |
| KR | 20200116322 A | 10/2020 |
| KR | 20210115564 A | 9/2021 |
| KR | 20210117107 A | 9/2021 |
| KR | 102323350 B1 | 11/2021 |
| KR | 102408069 B1 | 6/2022 |
| TW | 1278576 B | 4/2007 |
| WO | 2005068846 A1 | 7/2005 |
| WO | 2017079993 A1 | 5/2017 |
| WO | 2021073509 A1 | 4/2021 |
| WO | 2021095860 A1 | 5/2021 |
| WO | 2023046145 A1 | 3/2023 |
| WO | 2024099468 A1 | 5/2024 |
| WO | 2024131739 A2 | 6/2024 |

OTHER PUBLICATIONS

International Search Report,International Application No. PCT/CN2023/139669, International mailed Apr. 17, 2024 (20 pages).
International Search Report,International Application No. PCT/CN2023/139668, International mailed Apr. 11, 2024 (18 pages).
International Search Report,International Application No. PCT/CN2022/121246, mailed Dec. 29, 2022 (18 pages).
Canada First Office Action,Canada Application No. 3,233,163, mailed Apr. 19, 2024(7 pages).
Australian Examination Report No. 1, Application No. 2022349651,mailed Apr. 30, 2024(4 pages).
Australian Notice of Acceptance for Patent Application, Australian Application No. 2022349651, mailed Aug. 30, 2024 (4 pages).
US Non Final OA2, U.S. Appl. No. 18/616,410, US mailed Aug. 15, 2024(141 pages).
Japanese First Notice of Reasons for Refusal,Japanese Patent Application No. 2024-519102 ,mailed Oct. 22, 2024 (14 pages).
European Search Report, European Application No. 22872189.0, mailed Dec. 5, 2024 (103 pages).
Australian Examination Report No. 1, Australian Application No. 2023411862, mailed Dec. 19, 2024 (5 pages).
Australian Examination Report No. 1, Australian Application No. 2023378550, mailed Jan. 7, 2025 (6 pages).
Malaysia Adverse report on substantive examination, Malaysia Patent Application No. PI2024006369, mailed Jan. 2, 2025(5 pages).
US Final OA, U.S. Appl. No. 18/616,410, mailed Jan. 13, 2025 (92 pages).
Australian Examination Report No. 1, Australian Application No. 2023266955, mailed Feb. 14, 2025 (8 pages).
International Search Report and Written Opinion, International Application No. PCT/CN2024/107360, mailed Nov. 8, 2024 (19 pages).
International Search Report and Written Opinion, International Application No. PCT/CN2023/125354, mailed Nov. 24, 2023 (12 pages).
Australian Examination Report No. 1, Australian Application No. 2024287283,mailed Feb. 28, 2025 (7 pages).
Notice on Third Party Submission of IDS for U.S. Appl. No. 18/616,410, mailed Jan. 15, 2025 (196 pages).
US Non Final OA, U.S. Appl. No. 19/031,869, mailed Jul. 15, 2025 (152 pages).
Australian Third Examination Report , Australian Application No. 2023411862, mailed Jul. 9, 2025 (8 pages).
Canada First Office Action,Canada Application No. 3,256,202, mailed Jul. 7, 2025 (3 pages).
US Final OA, U.S. Appl. No. 18/922,280, mailed Jul. 3, 2025 (70 pages).
Malaysia Second Substantive Examination, Malaysia Application No. PI2025000690, mailed Jun. 26, 2025 (5 pages).
Malaysia Second Substantive Examination, Malaysia Application No. PI2025000692, mailed Jun. 23, 2025 (4 pages).
Japanese First Notice of Reasons for Refusal,Japanese Patent Application No. 2024-563563, mailed Jun. 3, 2025 (52 pages).
US Non Final OA, U.S. Appl. No. 18/792,626, mailed May 30, 2025 (100 pages).
Japanese Decision First of Refusal, Japanese Patent Application No. 2024-566694, mailed May 27, 2025 (11 pages).
Japanese Decision First of Refusal, Japanese Patent Application No. 2024-206845, mailed May 27, 2025 (10 pages).
Japanese First Notice of Reasons for Refusal,Japanese Patent Application No. 2024-577365, mailed Jul. 22, 2025 (47 pages).
Korea Third Party Submission the Reference for 10-2024-7011777, mailed Jul. 2, 2025 (5 pages).
Malaysia First Substantive Examination, Malaysia Application No. PI2024006199, mailed Jul. 30, 2025 (7 pages).
Malaysia First Substantive Examination, Malaysia Application No. PI2024006571, mailed Jul. 31, 2025 (6 pages).
US Third Party Submission of IDS for U.S. Appl. No. 18/792,626, mailed May 30, 2025 (95 pages).
US Third Party Submission of IDS for U.S. Appl. No. 19/095,179, mailed Aug. 22, 2025 (58 pages).
Japanese First Notice of Reasons for Refusal,Japanese Patent Application No. 2025-505446, mailed Jul. 19, 2025 (10 pages).
Korea Third Party Submission the Reference for 10-2024-7043005, mailed Jul. 2, 2025 (5 pages).
Japanese First Notice of Reasons for Refusal,Japanese Patent Application No. 2025-090653, mailed Aug. 5, 2025 (12 pages).
Malaysia Third Substantive Examination, Malaysia Application No. PI2025000692, mailed Sep. 3, 2025 (4 pages).
European partial Search Report, European Application No. 23905902.5, mailed Sep. 12, 2025 (58 pages).

(56) References Cited

OTHER PUBLICATIONS

U.S. Non Final OA, U.S. Appl. No. 19/095,179, mailed Sep. 15, 2025 (98 pages).
Malaysia Second Substantive Examination, Malaysia Application No. PI2024006199, mailed Sep. 12, 2025 (7 pages).
U.S. Final OA, U.S. Appl. No. 18/792,626, mailed Aug. 29, 2025 (65 pages).
U.S. Non Final OA, U.S. Appl. No. 18/922,280, mailed Oct. 7, 2025 (81 pages).
European extended Search Report, European Application No. 24836654.4, mailed Oct. 14, 2025 (8 pages).
European extended Search Report, European Application No. 23888153.6, mailed Oct. 15, 2025 (8 pages).
Canada First Office Action, Canada Application No. 3,251,815, mailed Oct. 7, 2025 (4 pages).
Canada First Office Action, Canada Application No. 3,251,828, mailed Oct. 21, 2025 (5 pages).
U.S. Final OA, U.S. Appl. No. 19/031,869, mailed Oct. 23, 2025 (47 pages).
Malaysia First Substantive Examination, Malaysia Application No. PI2025005073, mailed Oct. 31, 2025 (6 pages).
European extended Search Report, European Application No. 23803067.0, mailed Nov. 17, 2025 (11 pages).
Japanese Second Notice of Reasons for Refusal, Japanese Application No. 2024-206845, mailed Nov. 11, 2025 (10 pages).
Japanese Second Notice of Reasons for Refusal, Japanese Application No. 2024-566694, mailed Nov. 11, 2025 (12 pages).

\* cited by examiner
† cited by third party

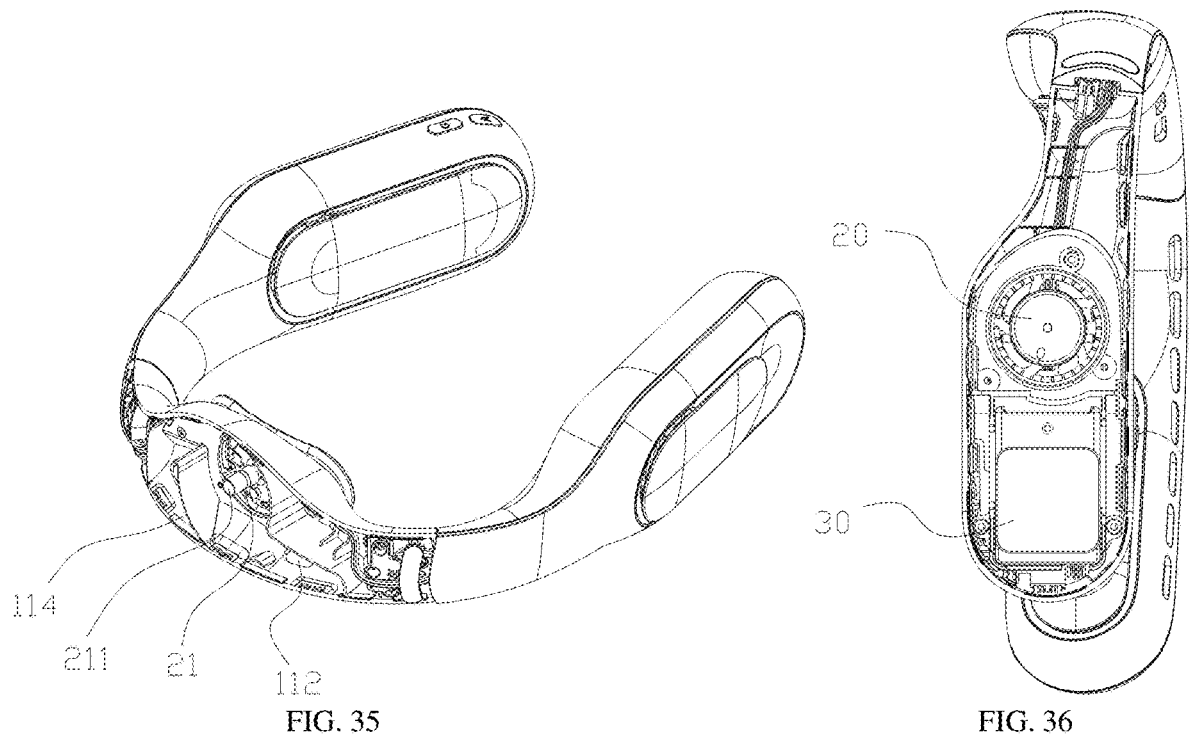
FIG. 35
FIG. 36
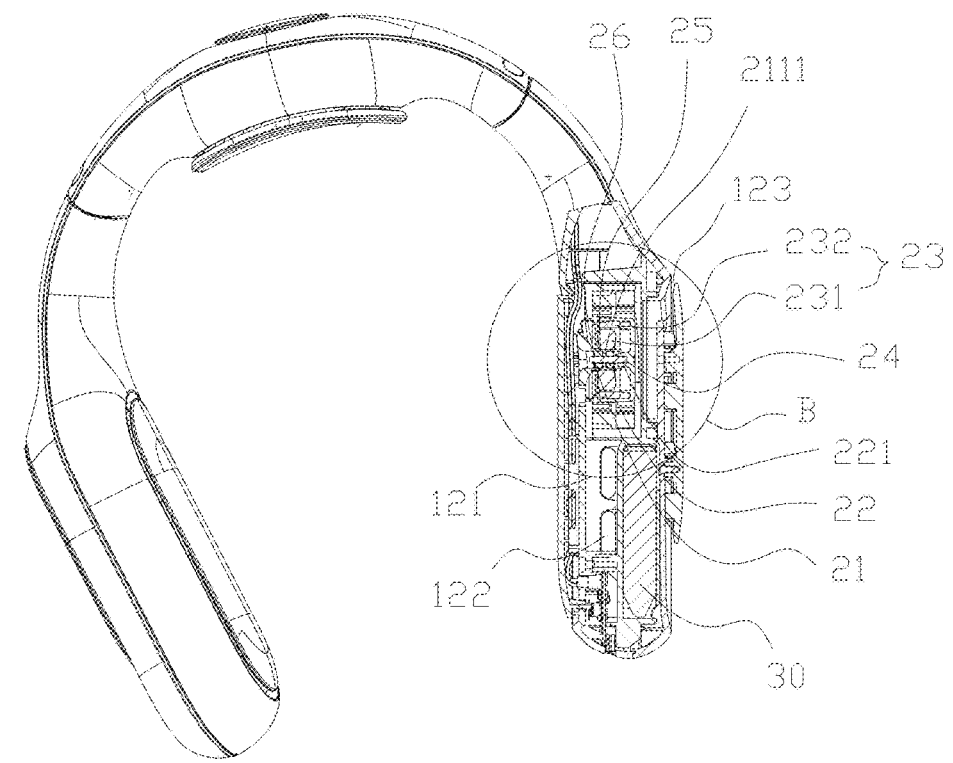
FIG. 37

PORTABLE FAN, DRIVE CIRCUIT, HANDHELD FAN, AND NECK FAN

CROSS REFERENCE TO RELATED APPLICATIONS

The present application is a continuation-in-part application of the international patent application No. PCT/CN2023/099539, filed on Jun. 9, 2023.

The international patent application No. PCT/CN2023/099539 claims priorities of: the Chinese patent application No. 202221176136.4, filed on May 11, 2022; the Chinese patent application No. 202221486507.9, filed on Jun. 14, 2022; the Chinese patent application No. 202221950040.9, filed on Jul. 25, 2022; the Chinese patent application No. 202222795438.6, filed on Oct. 21, 2022; the Chinese patent application No. 202222918924.2, filed on Nov. 2, 2022; the Chinese patent application No. 202222928106.0, filed on Nov. 2, 2022; the Chinese patent application No. 202222989400.2, filed on Nov. 9, 2022; the Chinese patent application No. 202223038810.5, filed on Nov. 15, 2022; the Chinese patent application No. 202223413732.2, filed on Dec. 19, 2022; the Chinese patent application No. 202320231044.X, filed on Feb. 8, 2023; the Chinese patent application No. 202320295274.2, filed on Feb. 16, 2023; the Chinese patent application No. 202320882604.8, filed on Apr. 17, 2023; the Chinese patent application No. 202320958823.X, filed on Apr. 17, 2023.

Contents of the above documents are incorporated herein by their entireties.

TECHNICAL FIELD

The present disclosure relates to the field of fans, and in particular to a portable fan, drive circuit, handheld fan, and neck fan.

BACKGROUND

Fans are very commonly-used domestic appliances in daily lives and can drive air to flow for cooling. Portable fans currently in the art has a light weight and can be easily carried and are popular among people. However, for the portable fan in the art, due to having a small size and a light weight, an airflow speed generated by the fan may be low, and after a long-term use, heat is generated, which may lead to an explosion.

SUMMARY OF THE DISCLOSURE

The present disclose provides a portable fan, including a fan and a power supply drive assembly electrically connected to the fan; wherein the power supply drive assembly comprises a battery and a fan drive circuit electrically connected to the battery. The fan drive circuit includes: a master control circuit; a three-phase drive circuit, comprising at least three signal input ends and three drive signal output ends; wherein each of the at least three signal input ends is electrically connected to the master control circuit to receive control signals; each of the three drive signal output ends is electrically connect to a respective one of three signal ends of a direct-current (DC) brushless fan motor to respectively output a three-phase drive signal to drive the DC brushless fan motor to rotate; and an inverted-phase electric potential detection circuit, comprising three detection branches; wherein each of the three detection branches comprises a detection end and a detection output end electrically connected to the detection end; three detection ends of the three detection branches are respectively electrically connected to the three drive signal output ends; three detection output ends of the three detection branches are electrically connected to the master control circuit to respectively output a first detection signal, a second detection signal, and a third detection signal; the master control circuit is informed of a phase of the three-phase drive signal based on the first detection signal, the second detection signal, and the third detection signal to adjust the control signals. The battery is configured to supply power to the fan drive circuit.

The present disclosure further provides a fan, including: a neck housing, defining a neck space, wherein the neck housing is configured to be worn to a neck of a user, and the neck is configured to be received in the neck space; an airflow portion, arranged inside the neck housing and configured to blow an airflow towards the neck space; wherein the airflow portion comprises rotation air blades and a three-phase motor drive assembly driveably connected to the rotation air blades to drive the rotation air blades to rotate to generate the airflow.

The present disclosure further provides a fan, including: an air duct portion, including a body portion, wherein the body portion defines an air guiding cavity therein; the air duct portion defines an air outlet and an air inlet respectively at opposite ends thereof; the air outlet and the air inlet are communicated to the air guiding cavity, and a positioning protruding post is arranged inside the body portion; an airflow portion, comprising rotation air blades and a drive portion that is driveably connected to the rotation air blades, wherein the rotation air blades are rotatably received in the air guiding cavity and are arranged facing towards the air outlet; the drive portion comprises a stator and a rotor sleeving an outside of the stator; the rotor is fixedly mounted on the rotation air blades and is coaxially arranged with the rotation air blades; the stator fixedly sleeves the positioning protruding post; the drive portion is a three-phase motor; a handheld portion, connected to the air duct portion, wherein the handheld portion defines a mounting cavity; a power supply assembly is received in the mounting cavity; and the power supply assembly is electrically connected to the three-phase motor.

BRIEF DESCRIPTION OF THE DRAWINGS

The present disclosure will be illustrates based on embodiments by referring to the accompanying drawings. The accompanying drawings of the present disclosure are used only to describe the embodiments. Any ordinary skilled person in the art may easily obtain other embodiments based on the described operations without deviating from the principles of the present disclosure.

FIG. 35 is a structural schematic view of the fan, having partial elements omitted, according to the Embodiment 13 of the present disclosure.

FIG. 36 is a structural schematic view of the fan, having partial elements omitted, according to the Embodiment 13 of the present disclosure.

FIG. 37 is a cross-sectional view of a portion of the portable fan according to the Embodiment 13 of the present disclosure.

DETAILED DESCRIPTION

Figure 1:
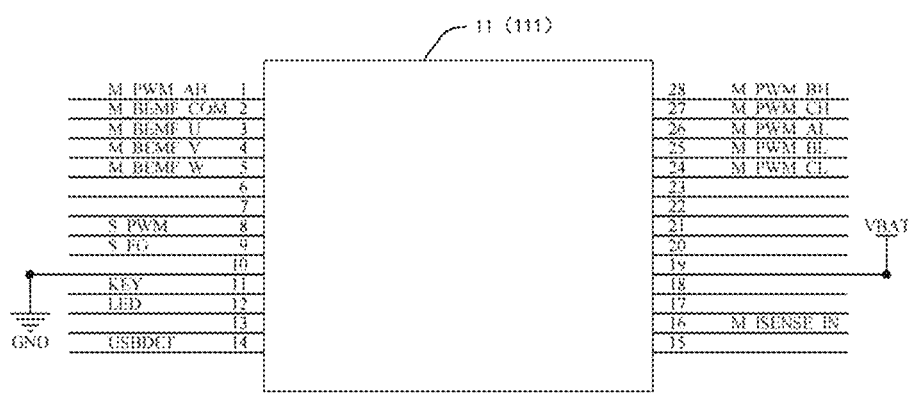
FIG. 1 is a circuit diagram of a master chip of a master control circuit of a fan drive circuit of the portable fan according to embodiments of the present disclosure.

In order to facilitate better understanding of purposes, structures, features and efficacies of the present disclosure, a portable fan of the present disclosure will be further described by referring to the accompanying drawings and specific embodiments.

Technical solutions in the embodiments of the present disclosure will be clearly and completely described below by referring to the accompanying drawings in the embodiments of the present disclosure. It is to be understood that the specific embodiments described herein are for the purpose of explaining the present disclosure only, and do not limit the present disclosure. It is also to be noted that, for the purpose of description, only partial structures related to the present disclosure, instead of all structures, are shown in the accompanying drawings. Based on the embodiments of the present disclosure, all other embodiments obtained by any ordinary skilled person in the art without creative work shall fall within the scope of the present disclosure.

The terms "first", "second", and so on, in the present disclosure are used to distinguish between different objects and are not used to describe a particular order. In addition, the terms "includes", "have", and any variations thereof, are intended to cover non-exclusive inclusion. For example, a process, a method, a system, a product, or an apparatus including a series of steps or units is not limited to the listed steps or units, but optionally further includes steps or units that are not listed or include steps or units that are inherently included in the process, the method, the system, the product, or the apparatus.

Reference to "embodiments" herein means that particular features, structures, or characteristics described in one embodiment may be included in at least one embodiment of the present disclosure. The presence of the phrase at various sections in the specification does not necessarily refer to one same embodiment or to a separate or alternative embodiment that is exclusive of other embodiments. It is understood by any ordinary skilled person in the art, both explicitly and implicitly, that the embodiments described herein may be combined with other embodiments.

It should be noted that when an element is described as being "fixed to" or "arranged" on another element, the element may be directly or indirectly on the another element. When an element is described as being "connected" to another element, the element may be directly or indirectly connected to the another element. The embodiments and features of the embodiments in the present disclosure may be combined with each other without conflict. The present disclosure will be described in detail below by referring to the accompanying drawings and the embodiments.

It is to understand that the terms "length", "width", "upper", "lower", "front", "rear", "left", "right", "vertical", "horizontal", "top", "bottom", "inside", "outside" and the like indicate orientations or positional relationships based on those shown in the accompanying drawings, and are used to facilitate and simplify description of the present disclosure. The terms are not intended to indicate or imply that a device or an element must have a specific orientation or must be constructed and operated in a specific orientation. Therefore, the terms shall not be interpreted as a limitation of the present disclosure.

Furthermore, the terms "first" and "second" are used only for descriptive purposes, and shall not be interpreted as indicating or implying relative importance or implicitly specifying the number of technical features indicated. Therefore, a feature defined by "first" and "second" may expressly or implicitly include one or more such features. In the description of this application, "a plurality of" means two or more, unless otherwise expressly and specifically limited.

A technical solution 1 is shown in FIGS. 1 to 24.

Figure 2:
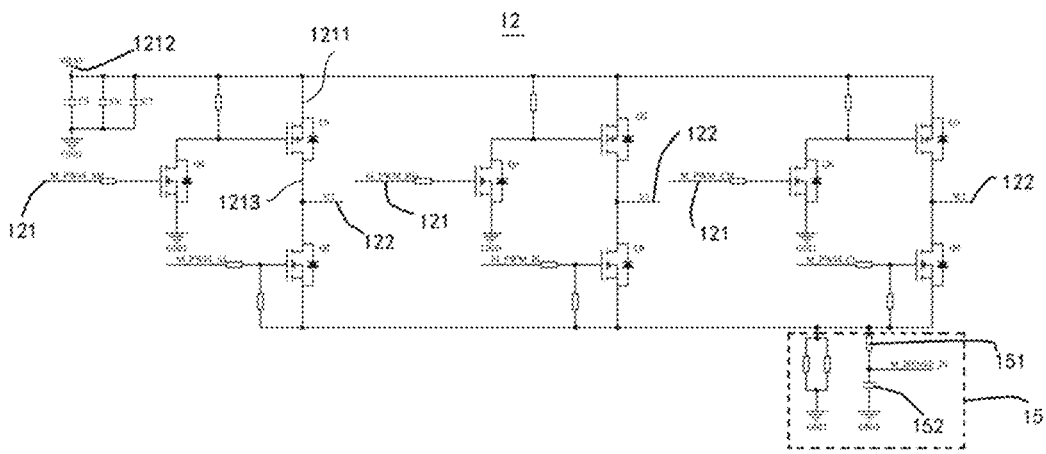
FIG. 2 is a circuit diagram of a three-phase drive circuit and a current detection circuit of the fan drive circuit of the portable fan according to embodiments of the present disclosure.
Figure 3:
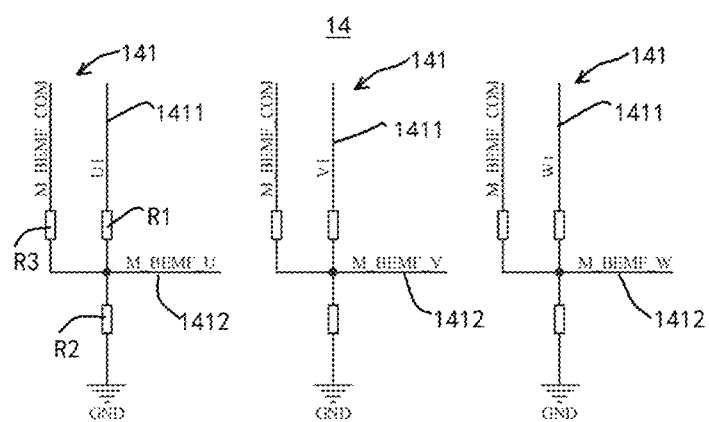
FIG. 3 is a circuit diagram of an inverted-phase electric potential detection circuit of the fan drive circuit of the portable fan according to embodiments of the present disclosure.

As shown in FIGS. 1 to 3, the present embodiment provides a drive circuit for a portable fan. The fan drive circuit of the portable fan is applicable for various types of fans. Specifically, the drive circuit for the portable fan includes: a master control circuit 11, a three-phase drive circuit 12, and an inverted-phase electric potential detection circuit 14.

The three-phase drive circuit 12 includes at least three signal input ends 121 and three drive signal output ends 122. Each of the at least three signal input ends 121 is electrically connected to the master control circuit 11 to receive control signals. The three drive signal output ends 122 are electrically connect to three signal ends (U, V, and W) of a direct-current (DC) brushless fan motor to output a three-phase drive signal to drive the DC brushless fan motor to rotate. The inverted-phase electric potential detection circuit 14 includes three detection branches 141. Each detection branch 141 includes a detection end 1411 and a detection output end 1412 electrically connected to the detection end. Three detection ends 1411 of the three detection branches 141 are respectively electrically connected to the three drive signal output ends 122. Three detection output ends 1412 of the three detection branches 141 are electrically connected to the master control circuit 11 to respectively output a first detection signal, a second detection signal, and a third detection signal. In this way, the master control circuit 11 is informed of a phase of the three-phase drive signal based on the first detection signal, the second detection signal, and the third detection signal to adjust the control signals.

As shown in FIG. 3, the detection branch 141 includes a first detection resistor R1, a second detection resistor R2, and a third detection resistor R3. The first detection resistor R1 and the second detection resistor are connected to each other in series. An end of the first detection resistor R1 away from the second detection resistor R2 is the detection end 1411, and an end of the second detection resistor R2 away from the first detection resistor R1 is grounded. A node between the first detection resistor R1 and the second detection resistor R2 is the detection output end 1412.

By arranging the three-phase drive circuit 12, energy-saving performance and control performance of the fan motor are improved, and a service life of the fan drive circuit and the portable fan is extended. By arranging the inverted-phase electric potential detection circuit 14, the master control circuit 11 may be easily informed of the phase of the DC brushless fan motor, such that the master control circuit 11 may send corresponding control signals to the three-phase drive circuit 12 to control driving of the DC brushless fan motor, and reliability and stability of the driving is improved.

As shown in FIG. 2, the three-phase drive circuit 12 includes a first transistor Q1, a second transistor Q2, a third transistor Q3, a fourth transistor Q4, a fifth transistor Q5, a sixth transistor Q6, a seventh transistor Q7, an eighth transistor Q8, and a ninth transistor Q9. A first conductive end 1211 of the first transistor Q1, a first conductive end 1211 of the second transistor Q2, and a first conductive end 1211 of the third transistor Q3 are connected to a power supply end 1212. A first conductive end 1211 of the fourth transistor Q4 is connected to the power supply end 1212. A first conductive end 1211 of the fifth transistor Q5 is connected to the power supply end 1212. A first conduction end 1211 of the sixth transistor Q6 is connected to the power supply end 1212. A control end of the fourth transistor Q4, a control end of the fifth transistor Q5, and a control end of the sixth transistor Q6 are electrically connected to the master control circuit 11. A control end of the seventh transistor Q7 is electrically connected to the control end of the fourth transistor Q4, a control end of the eighth transistor Q8 is electrically connected to the control end of the fifth transistor Q5, and a control end of the ninth transistor Q9 is electrically connected to the control end of the sixth transistor Q6, such that the control signals are received. Second conduction ends 1213 of the fourth transistor Q4, the fifth transistor Q5, and the sixth transistor Q6 are grounded. A first conductive end 1211 of the seventh transistor Q7 is connected to a second conductive end 1213 of the first transistor Q1. A second conductive end 1213 of the seventh transistor Q7 is grounded. A first conductive end 1211 of the eighth transistor Q8 is connected to a second conductive end 1213 of the second transistor Q2. A second conductive end 1213 of the eighth transistor Q8 is grounded. A first conductive end 1211 of the ninth transistor Q9 is connected to the second conductive end 1213 of the third transistor Q3. A second conductive end 1213 of the ninth transistor Q9 is grounded. A node between the first conductive 1211 of the seventh transistor Q7 and the second conductive 1213 of the first transistor Q1, a node between the first conductive 1211 of the eighth transistor Q8 and the second conductive 1213 of the second transistor Q2, and a node between the first conductive 1211 of the ninth transistor Q9 and the second conductive 1213 of the third transistor Q3 respectively serve as the three drive signal output ends 122. The at least three signal input ends 121 are three PWM signal input ends. The control signals include three PWM signals.

As shown in FIG. 2, the fan drive circuit further includes a current detection circuit 15. The second conductive ends 1213 of the seventh transistor Q7, the eighth transistor Q8, and the ninth transistor Q9 are all grounded via the current detection circuit 15. The current detection circuit 15 is electrically connected to the master control circuit 11. The current detection circuit 15 includes a sense resistor 151 and a sense capacitor 152. The second conductive ends 1213 of the seventh transistor Q7, the eighth transistor Q8, and the ninth transistor Q9 are grounded via the sense resistor 151 and the sense capacitor 152 sequentially. A node between the sense resistor 151 and the sense capacitor 152 is electrically connected to the master control circuit 11. By arranging the current detection circuit 15, when a current is abnormal, the master control circuit 11 may control the fan drive circuit to stop operating or to operate at a lower power, such that an overcurrent protection is provided for the fan drive circuit, and reliability and the service life of the fan drive circuit are improved.

Figure 4:
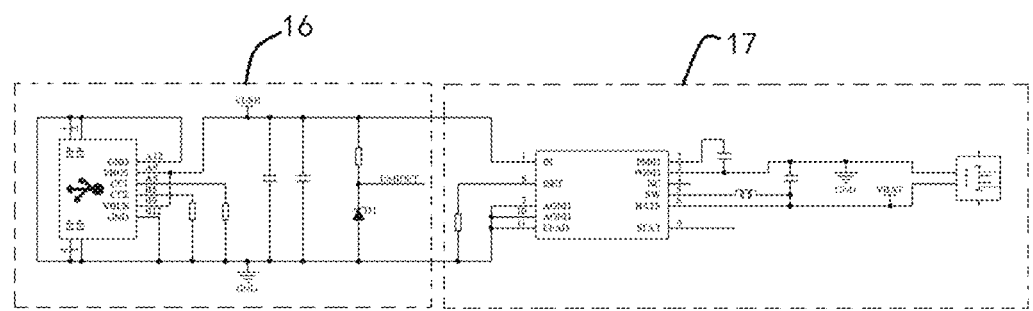
FIG. 4 is a circuit diagram of an interface circuit and a charge management circuit of the fan drive circuit of the portable fan according to embodiments of the present disclosure.
Figure 6:
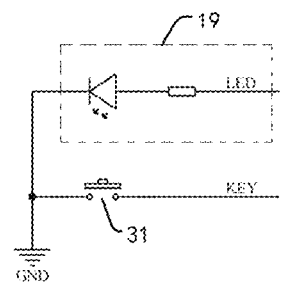
FIG. 6 is a circuit diagram of an indicator branch and a keypad of the fan drive circuit of the portable fan according to embodiments of the present disclosure.

As shown in FIGS. 4 and 6, the fan drive circuit further includes an interface circuit 16 and a charge management circuit 17. The interface circuit 16 is configured to be electrically connected to an external power source to receive an external voltage. The charge management circuit 17 is electrically connected between the interface circuit 16 and a battery VBAT to receive the external voltage and to charge or output a power supply voltage to the battery VBAT. The fan drive circuit further includes a keypad 31. An end of the keypad 31 is connected to the master control circuit 11, and the other end of the keypad 31 is grounded. The fan drive circuit further includes an indicator branch 19. The indicator branch 19 includes a light-emitting diode and a resistor that is connected in series to the light-emitting diode. A positive electrode of the light-emitting diode is electrically connected to the master control circuit 11, and a negative electrode of the light-emitting diode is grounded.

Specifically, in the present embodiment, the fan drive circuit may be arranged for a neck fan and a handheld fan, but is not limited to the neck fan and the handheld fan, the fan drive circuit may further be applied to other portable fans such as desktop table fans, floor fans, clip fans, folding fans, and the like. Two DC brushless fan motors are respectively arranged in a left side and a right side of the neck fan and are configured to respectively drive fan blades in the left side and fan blades in the right side of the neck fan to rotate.

Figure 5:
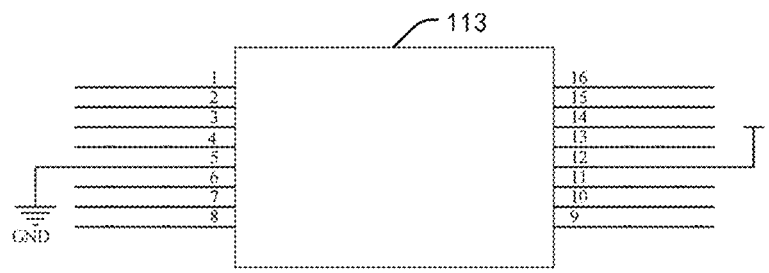
FIG. 5 is a schematic view of an auxiliary chip of the master control circuit of the fan drive circuit of the portable fan according to embodiments of the present disclosure.

As shown in FIGS. 1, 2, and 5, the master control circuit 11 includes a master control chip 111 and an auxiliary chip 113. The master control circuit 11 includes the master control chip 111 and the auxiliary chip 113. Two three-phase drive circuits 12, two inverted-phase electric potential detection circuits 14, and two DC brushless fan motors are arranged in one-to-one correspondence to each other. The master control chip 111 is electrically connected to one of the two three-phase drive circuits 12 to output the control signals to one of the two three-phase drive circuits 12 to drive the respective one of the two brushless DC fan motors. The inverted-phase electric potential detection circuit 14 is electrically connected to one three-phase drive circuit 12 and outputs the first detection signal, the second detection signal, and the third detection signal to the master control chip 111. In this way, the master control chip 111 is informed of the phase of the three-phase drive signal of the one three-phase drive circuit 12 to adjust the control signals output to the one three-phase drive circuit 12. The auxiliary chip 113 is electrically connected to the other three-phase drive circuit 12 to output the control signals to the other three-phase drive circuit 12 to drive the other one of the two DC brushless fan motors. The other inverted-phase electric potential detection circuit 14 is electrically connected to the respective one three-phase drive circuit 12 and outputs a corresponding first detection signal, a corresponding second detection signal and a corresponding third detection signal to the auxiliary chip 113. In this way, the auxiliary chip 113 is informed of the phase of the three-phase drive signal of the other three-phase drive circuit 12 to adjust the control signals output to the other three-phase drive circuit 12.

In this embodiment, the master control chip 111, the corresponding three-phase drive circuit 12, and the corresponding inverted-phase electric potential detection circuit 14 are arranged on one module (such as on a first circuit board) and may be arranged on a same side of the neck fan as the corresponding DC brushless fan motor. The auxiliary chip 113, the corresponding three-phase drive circuit 12, and the corresponding inverted-phase electric potential detection circuit 14 are arranged on another one module (such as on a second circuit board that is independent from the first circuit board) and may be arranged on the other side of the neck fan, together with the corresponding DC brushless fan motor. It is understood that the above configuration has better rationality and compactness, and reliability of connection and driving is improved. However, arrangement of the three-phase drive circuit 12, the inverted-phase electric potential detection circuit 14, the master control chip 111, and the auxiliary chip 113 may be arranged in various manners. For example, the three-phase drive circuit 12, the inverted-phase electric potential detection circuit 14, the master control chip 111, and the auxiliary chip 113 are arranged on a same circuit board; alternatively, the three-phase drive circuit 12 and the inverted-phase electric potential detection circuit 14 are arranged on one circuit board, and the master control chip 111 and the auxiliary chip 113 are arranged on another one circuit board. The arrangement may be determined according to the actual demands, which will not described here.

Figure 7:
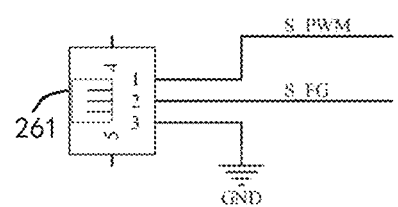
FIG. 7 is a schematic view of a first speed regulating member of the fan drive circuit of the portable fan according to embodiments of the present disclosure.
Figure 8:
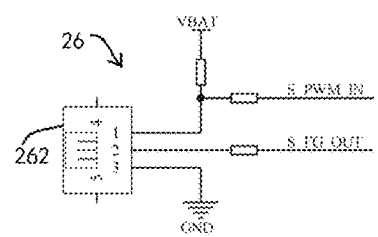
FIG. 8 is a schematic view of a second speed regulating member of the fan drive circuit of the portable fan according to embodiments of the present disclosure.
Figure 9:
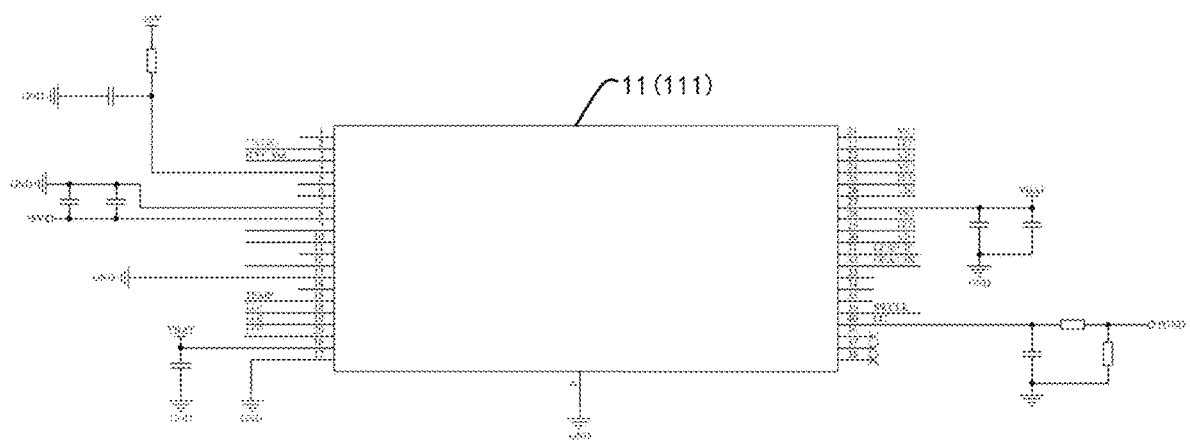
FIG. 9 is a schematic view of the master control circuit of the fan drive circuit of the portable fan according to embodiments of the present disclosure.

As shown in FIGS. 7 and 8, the fan drive circuit further includes a first connector 261 and a speed adjustment interface circuit 26 having a second connector 262. A first pin and a second pin of the first connector 261 are electrically connected to the master control chip 111. A third pin of the first connector 261 is grounded. A first pin of the second connector 262 is connected to the battery VBAT via a first connection resistor and is also connected to the auxiliary chip 113 via a second connection resistor. A second pin of the second connector 262 is connected to the auxiliary chip 113 via a third connection resistor, and a third pin of the second connector 262 is grounded. In addition, each pin of the first connector 261 and the second connector 262 may be electrically connected to each other in one-to-one correspondence with each other. In this way, rotation speeds of the two DC brushless fan motors may be synchronously adjusted.

As shown in FIGS. 9 to 14, the fan drive circuit of a second embodiment is shown. Portions of the fan drive circuit of the present embodiment are the same as those in the first embodiment and will not be repeated. Portions of the fan drive circuit of the present embodiment that are different from those in the first embodiment will be described in the following. Firstly, the master control circuit 11 of the present embodiment is different from that of the first embodiment, and the master control circuit 11 of the present embodiment may substantially include the master control chip 111.

Figure 10:
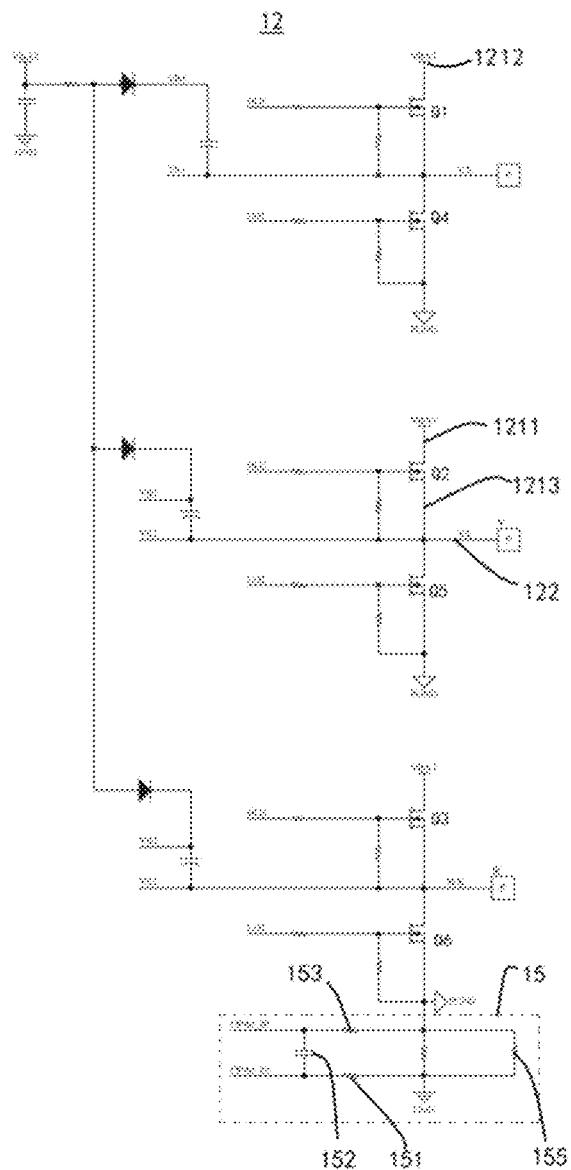
FIG. 10 is a schematic view of the three-phase drive circuit and the current detection circuit of the fan drive circuit of the portable fan according to embodiments of the present disclosure.

As shown in FIG. 10, in the present embodiment, the three-phase drive circuit 12 includes a first transistor Q1, a second transistor Q2, a third transistor Q3, a fourth transistor Q4, a fifth transistor Q5, and a sixth transistor Q6. A first conductive end 1211 of the first transistor Q1, a first conductive end 1211 of the second transistor Q2, and a first conductive end 1211 of the third transistor Q3 are connected to a power supply end 1212. A first conductive end 1211 of the fourth transistor Q4 is connected to a second conductive end 1213 of the first transistor Q1. A first conductive end 1211 of the fifth transistor Q5 is connected to a second conductive end 1213 of the second transistor Q2. A first conduction end 1211 of the sixth transistor Q6 is connected to a second conductive end 1213 of the third transistor Q3. A node between the first conductive 1211 of the fourth transistor Q4 and the second conductive 1213 of the first transistor Q1, a node between the first conductive 1211 of the fifth transistor Q5 and the second conductive 1213 of the second transistor Q2, and a node between the first conductive 1211 of the sixth transistor Q6 and the second conductive 1213 of the third transistor Q3 respectively serve as the three drive signal output ends 122. Control ends of the first transistor Q1, the second transistor Q2, the third transistor Q3, the fourth transistor Q4, the fifth transistor Q5, and the sixth transistor Q6 are electrically connected to the master control circuit 11 to receive the control signals; and the control signals include six PWM signals.

As shown in FIG. 10, substantially the same as the first embodiment, the second conductive end 1213 of the sixth transistor Q6 is grounded via the current detection circuit 15, and the current detection circuit 15 is electrically connected to the master control circuit 11. The current detection circuit 15 includes a sense resistor 151 and a sense capacitor 152. The second conductive end 1213 of the sixth transistor Q6 is grounded via the sense resistor 151. The sense capacitor 152 is connected in parallel with the sense resistor 151. A node between the sense resistor 151 and the second conduction end 1213 of the sixth transistor Q6 is electrically connected to the master control circuit 11. The current detection circuit 15 further includes a first series resistor 153, a second series resistor 154, a parallel resistor 155. The parallel resistor 155 is connected in parallel with the sense resistor 151. The first series resistance 153 is connected between an end of the sense capacitor 152 and an end of the sense resistor 151. The second series resistance 154 is connected between the other end of the sense capacitor 152 and the other end of the sense resistor 151. By arranging the current detection circuit 15, when the current is abnormal, the master control circuit 11 may control the fan drive circuit to stop operating or to operate at a lower power, such that an overcurrent protection is provided for the fan drive circuit, and reliability and the service life of the fan drive circuit are improved.

Figure 11:
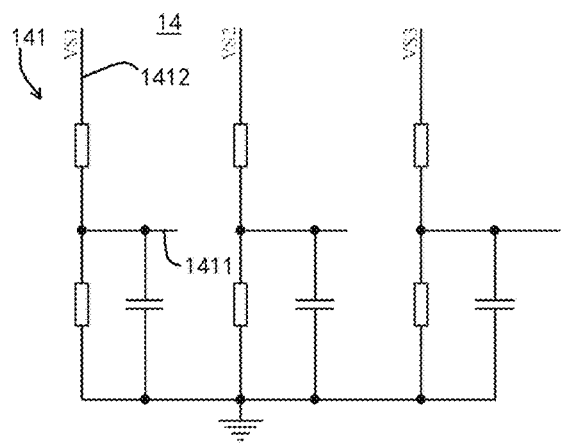
FIG. 11 is a schematic view of the inverted-phase electric potential detection circuit of the fan drive circuit of the portable fan according to embodiments of the present disclosure.

As shown in FIG. 11, the inverted-phase electric potential detection circuit 14 of the second embodiment is substantially the same as that of the first embodiment, and will not be repeated herein.

Figure 12:
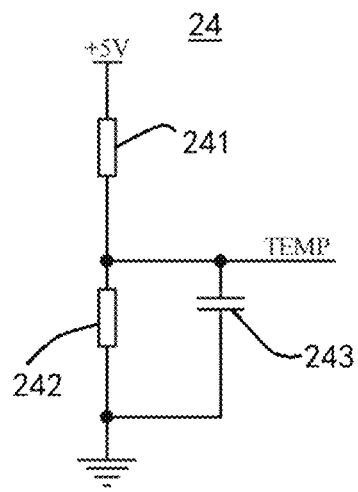
FIG. 12 is a schematic view of a transistor temperature detection circuit of the fan drive circuit of the portable fan according to embodiments of the present disclosure.

As shown in FIG. 12, the fan drive circuit further includes a transistor temperature detection circuit 24. The transistor temperature detection circuit 24 may be disposed adjacent to each transistor of the three-phase drive circuit 12 and includes a first voltage divider resistor 241 and a thermistor 242 connected in series with the first voltage divider resistor 241. The thermistor 242 is configured to sense a temperature of each transistor of the three-phase drive circuit 12. A node between the first voltage divider resistor 241 and the thermistor 242 is electrically connected to the master control circuit 11 and is configured to output a temperature signal, enabling the master control circuit 11 to control, based on the temperature signal, the fan drive circuit to enter or not enter a temperature protection state. The thermistor 242 is connected between the first voltage divider resistor 241 and the ground. The transistor temperature detection circuit 24 further includes a voltage regulated capacitor 243 connected in parallel with the thermistor 242. By arranging the transistor temperature detection circuit 24, the master control circuit 11 may be informed whether the temperature of each transistor of the three-phase drive circuit 12 is abnormal and may control the fan drive circuit to stop operating or to operate at a lower power when the temperature is abnormal. In this way, an over-temperature protection is provided for the fan drive circuit, and reliability and the service life of the fan drive circuit are improved.

Figure 13:
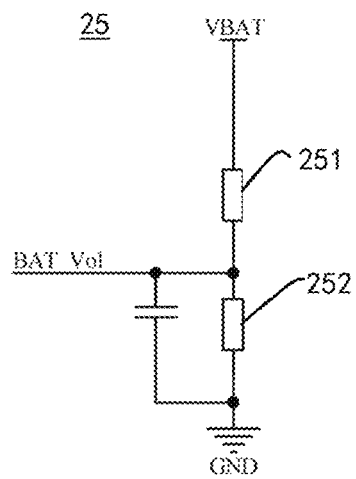
FIG. 13 is a schematic view of a battery voltage detection circuit of the fan drive circuit of the portable fan according to embodiments of the present disclosure.

As shown in FIG. 13, the fan drive circuit further includes a battery voltage detection circuit 25 that is electrically connected between the positive electrode of the battery VBAT and the ground. An output end of the battery voltage detection circuit 25 is electrically connected to the master control circuit 11. By arranging the battery voltage detection circuit 25, the master control circuit 11 may be informed whether a battery voltage is normal or not. When the battery voltage is abnormal, the master control circuit 11 may control the fan drive circuit to stop operating or to operate at a lower power. Therefore, reliability and the service life of the fan drive circuit are improved.

Specifically, the battery voltage detection circuit 25 includes a second voltage divider resistor 251 and a third voltage divider resistor 252 that is connected in series to the second voltage divider resistor 251. A node between the second voltage divider resistor 251 and the third voltage divider resistor 252 is electrically connected to the master control circuit 11. It is understood that the above-described battery voltage detection circuit 25 is simple in structure and has high reliability and a low cost.

Figure 14:
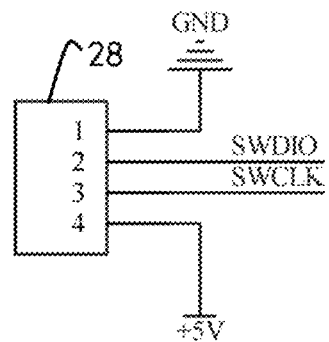
FIG. 14 is a schematic view of a burner interface of the fan drive circuit of the portable fan according to embodiments of the present disclosure.

As shown in FIG. 14, the fan drive circuit of the second implementation further includes a burner interface 28 to burn in a control program to the master control circuit 11. The burner interface 28 may be a SWD burner interface, but is not limited to the above.

Figure 15:
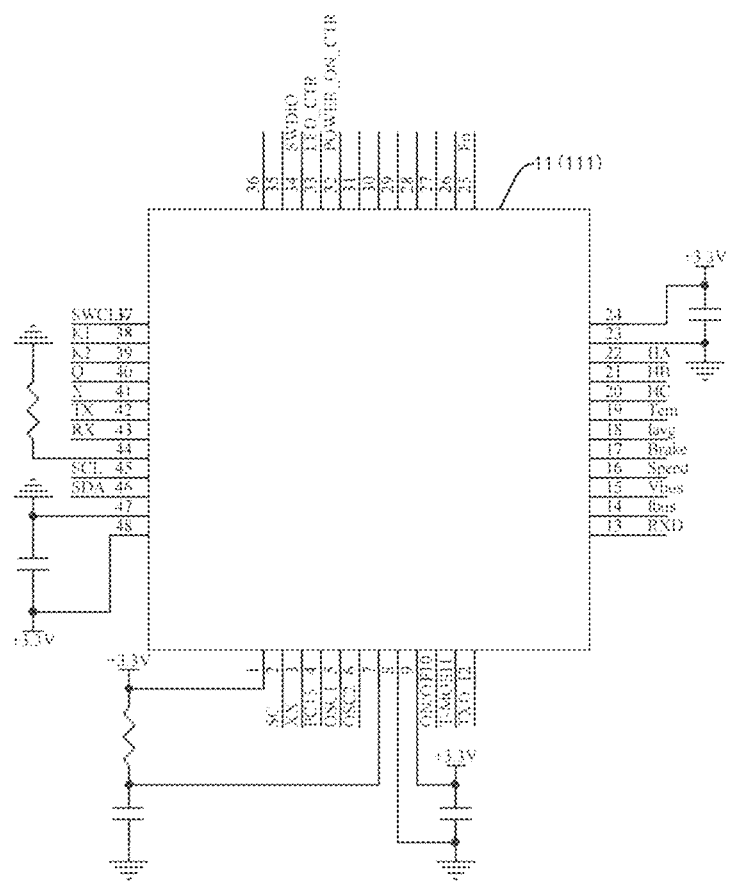
FIG. 15 is a schematic view of the master chip of the master control circuit of the fan drive circuit of the portable fan according to embodiments of the present disclosure.
Figure 16:
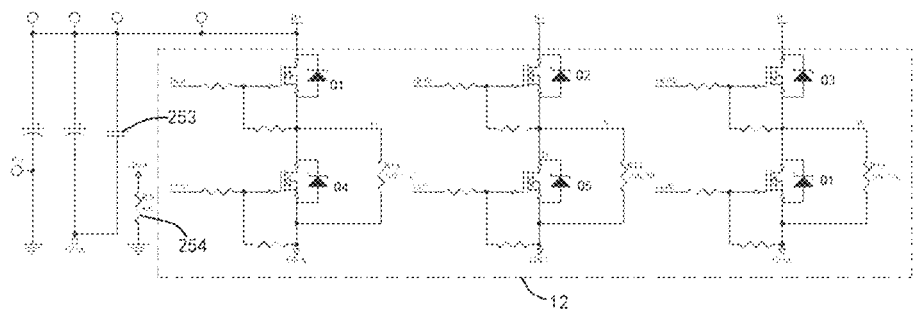
FIG. 16 is a schematic view of the three-phase drive circuit and the battery voltage detection circuit of the fan drive circuit of the portable fan according to embodiments of the present disclosure.

As shown in FIGS. 15 to 16, the fan drive circuit of a third embodiment is provided. Portions of the fan drive circuit of the present embodiment are the same as those in the second embodiment and will not be repeated. Portions of the fan drive circuit of the present embodiment that are different from those in the second embodiment will be described in the following.

Figure 17:
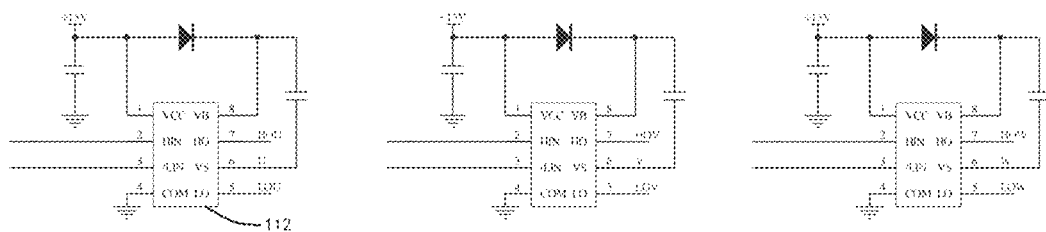
FIG. 17 is a schematic view of three three-phase control chips of the master control circuit of the fan drive circuit of the portable fan according to embodiments of the present disclosure.

As shown in FIG. 16 to FIG. 17, the three-phase drive circuit 12 of the third embodiment is essentially the same as the three-phase drive circuit 12 of the second embodiment. The master control circuit 11 of the third embodiment is different from that of the second embodiment. In the present embodiment, the master control circuit 11 includes a master control chip 111 and three three-phase control chips 112. Each of the three three-phase control chips 112 is electrically connected to the master control chip 111 and the three-phase drive circuit 12.

Figure 18:
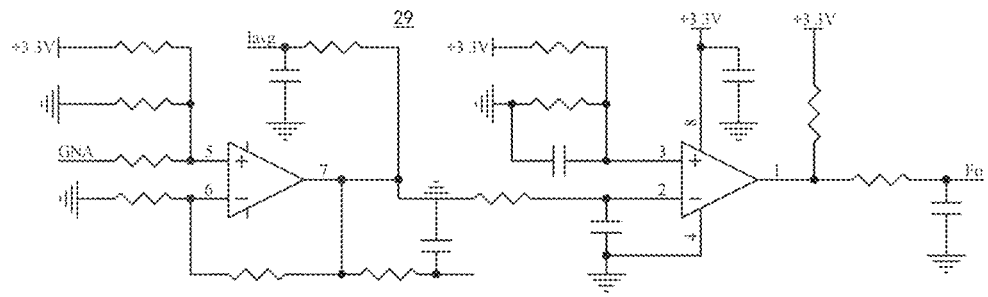
FIG. 18 is a schematic view of a signal amplification circuit of the fan drive circuit of the portable fan according to embodiments of the present disclosure.

As shown in FIGS. 16 and 18, the fan drive circuit further includes a filter capacitor 253 and a sampling resistor 254 connected in series to the filter capacitor 253. The sampling resistor 254 is connected between the filter capacitor 253 and the ground. A node between the filter capacitor 253 and the sampling resistor 254 is electrically connected to the master control circuit 11. Further, the fan drive circuit further includes a signal amplification circuit 29. An input end of the signal amplification circuit 29 is connected to the node between the filter capacitor 253 and the sampling resistor 254. The signal amplification circuit 29 is configured to amplify a signal sampled by the sampling resistor 254 (i.e., a signal of the node between the filter capacitor 253 and the sampling resistor 254) and to provide the amplified signal to the master control circuit 11. In this way, the main control circuit 11 of the fan drive circuit may keenly detect an abnormal voltage or current signal when the fan drive circuit is abnormal and then perform protection against the abnormalities, such as stopping operating or reducing a fan speed. In this way, safety of using the fan drive circuit is improved.

Figure 19:
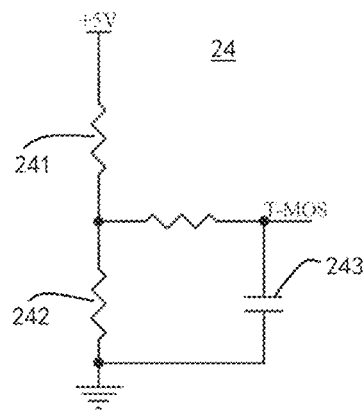
FIG. 19 is a schematic view of the transistor temperature detection circuit of the fan drive circuit of the portable fan according to embodiments of the present disclosure.

As shown in FIG. 19, the transistor temperature detection circuit 24 of the third embodiment is essentially the same as that of the second embodiment and will not be repeated herein.

Figure 20:
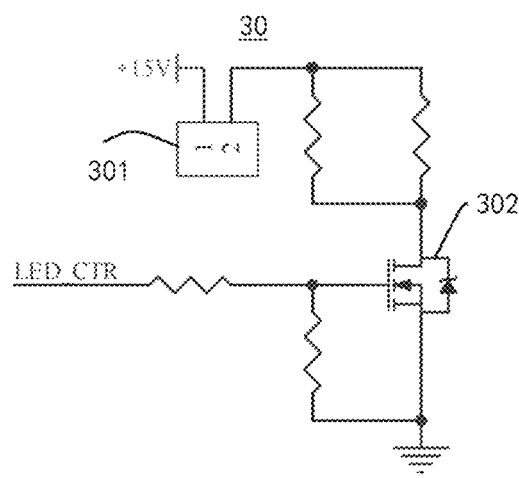
FIG. 20 is a schematic view of a light control circuit of the fan drive circuit of the portable fan according to embodiments of the present disclosure.

As shown in FIG. 20, a schematic view of a light control circuit 30 of the fan drive circuit in the third embodiment is provided. The light control circuit 30 includes a light-emitting element 301 and a control switch 302. A positive electrode of the light-emitting element 301 receives a drive voltage. A negative electrode of the light-emitting element 301 is grounded via two conductive ends of the resistor and the control switch 302. A control end of the control switch 302 is electrically connected to the master control circuit 11, such that the master control circuit 11 outputs a light control signal to the control end of the control switch 302 to control the light-emitting element 301 to emit light.

Figure 21:
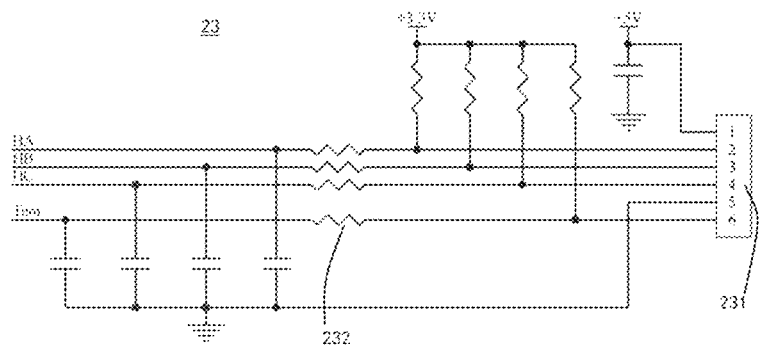
FIG. 21 is a schematic view of a Hall detection circuit of the fan drive circuit of the portable fan according to embodiments of the present disclosure.

As shown in FIG. 21, the fan drive circuit further includes a Hall detection circuit 23. The Hall detection circuit 23 is electrically connected to the master control circuit 11 to detect a magnetic field generated by the DC brushless fan motor and to output a Hall detection signal to the master control circuit 11. In this way, the master control circuit 11 may be informed, based on the Hall detection signal, of a position of a rotor of the DC brushless fan motor, such that the master control circuit 11 may provide a corresponding control signal to control the DC brushless fan motor to operate. In this case, a start-up time length of the fan using the fan drive circuit is shorter, and the fan may not shake during starting-up, and a better user experience is provided.

As shown in FIG. 21, the Hall detection circuit 23 further includes a motor temperature detection element 232 connected between a Hall element 231 of the Hall detection circuit 23 and the master control circuit 11. The motor temperature detection element 232 may be a sampling resistor. By arranging the motor temperature detection element 232, the master control circuit 11 may be informed of whether a temperature of the DC brushless fan motor is abnormal. When the temperature of the DC brushless fan motor is abnormal, the master control circuit 11 may control the fan drive circuit to stop operating or operate at a lower power, such that an over-temperature protection is provided for the fan drive circuit, and reliability and the service life of the fan drive circuit are improved.

Figure 22:
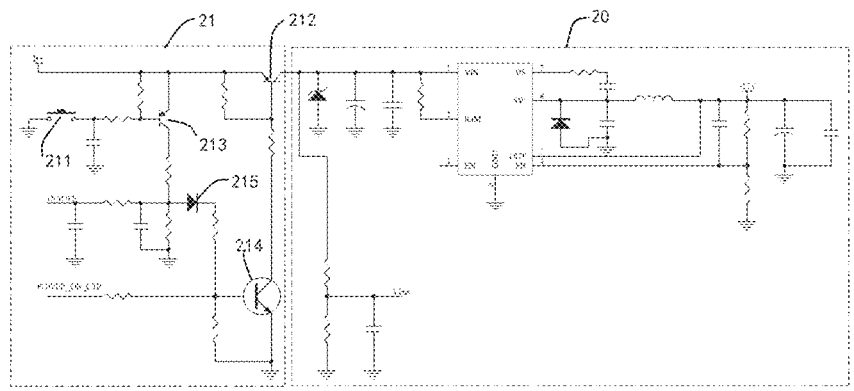
FIG. 22 is a schematic view of a switch control circuit of the fan drive circuit of the portable fan according to embodiments of the present disclosure.

As shown in FIGS. 17 and 22, the fan drive circuit further includes a voltage conversion circuit 20. The voltage conversion circuit 20 is configured to receive a battery voltage (VB+), convert the battery voltage into a drive voltage (such as 15V), and provide the drive voltage to power supply ends of the three three-phase control chips 112. The master control chip 111 is configured to output a master control signal to the three three-phase control chips 112, such that each of the three three-phase control chips 112 outputs the respective control signal to the three-phase drive circuit 12.

The fan drive circuit further includes a switch control circuit 21. The switch control circuit 21 is electrically connected to the battery VBAT, the voltage conversion circuit 20, and the master control circuit 11 to control operation of the voltage conversion circuit 20. The switch control circuit 21 includes a keypad 211, a first switch transistor 212, a second switch transistor 213, and a third switch transistor 214. Two conductive ends of the first switch transistor 212 are respectively connected to the positive electrode of the battery VBAT and the input end of the voltage conversion circuit 20. A control end of the first switch transistor 212 is grounded via two conductive ends of the third switch transistor 214. The positive electrode of the battery VBAT is connected to the control end of the third switch transistor 214 via the two conductive ends of the first switch transistor 212 and a one-way diode 215. A control end of the second switch transistor 213 is grounded via the keypad 211. A control end of the third switch transistor 214 is electrically connected to the master control circuit 11. A node between the second switch transistor 213 and the one-way diode 215 is further electrically connected to a switch signal end of the master control circuit 11.

When the keypad 211 is pressed to be conductive, the second switch transistor 213 is turned on, the third switch transistor 214 is turned on, and the node between the second switch transistor 213 and the one-way diode 215 outputs a first switching signal (ON) to the switch signal end of the master control circuit 11. The first switch transistor 212 is turned on to enable the battery voltage of the battery VBAT to be supplied to the voltage conversion circuit 20. When the pressing on the keypad 211 is released, the second switch transistor 213 is turned off, the master control circuit 11 maintains the third switch transistor 214 to be turned on based on a power supply turn-on signal being output from the first switching signal to the control end of the third switch transistor 214, and the battery voltage of the battery VBAT is supplied to the voltage conversion circuit 20.

Further, when the battery voltage of the battery VBAT is supplied to the voltage conversion circuit 20, and when the keypad 211 is again pressed to be conductive, the node between the second switch transistor 213 and the one-way diode 215 outputs a second switching signal (OFF) to the switch signal end of the master control circuit 11, the master control circuit 11 controls the third switch transistor 214 to be turned off based on a power supply turn-off signal being output from the second switching signal to the control end of the third switch transistor 214. In this way, the first switch transistor 212 is turned off, the battery voltage of the battery VBAT cannot be supplied to the voltage conversion circuit 20 until the keypad 211 is again pressed.

The keypad 211, the first switch transistor 212, the second switch transistor 213 and the third switch transistor 214 operate together with the master control circuit 11 to control whether the battery voltage of the battery VBAT is supplied to the voltage conversion circuit 20. In this way, a simple control logic is provided, and the circuit has higher reliability.

Figure 23:
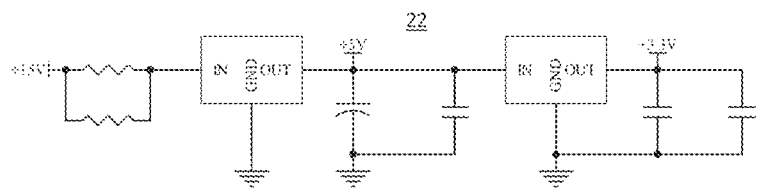
FIG. 23 is a schematic view of a direct current conversion circuit of the fan drive circuit of the portable fan according to embodiments of the present disclosure.

As shown in FIG. 23, the fan drive circuit further includes a DC conversion circuit 22. The DC conversion circuit 22 is configured to receive the drive voltage (such as a DC voltage of 15V) and convert the drive voltage to other DC operating voltages, such as a DC operating voltage of 3.3V and 5V.

Figure 24:
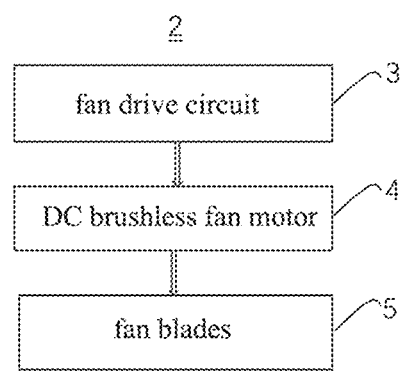
FIG. 24 is a schematic block view of the portable fan according to embodiments of the present disclosure.

As shown in FIG. 24, the present disclosure further provides a portable fan 2. The portable fan 2 includes a fan drive circuit 3, a DC brushless fan motor 4, and fan blades 5 driven by the DC brushless fan motor. The fan drive circuit 3 may be arranged with the fan drive circuit as described in any of the above embodiments.

For the fan drive circuit and the portable fan 2 in the present embodiment, the master control circuit 11, the three-phase drive circuit 12, the inverted-phase electric potential detection circuit 14, and the DC brushless fan motor are arranged. The energy-saving performance and control performance of the fan motor are improved, such that reliability of the fan drive circuit and the fan 2 are improved. In addition, the service life of the fan drive circuit and the fan 2 is extended, the arrangement of the DC brushless fan motor allows the fan 2 to have a more compact and smaller configuration, and the fan 2 has increased competitiveness in the market.

A technical solution 2 is shown in FIGS. 25 to 30.

Figure 25:
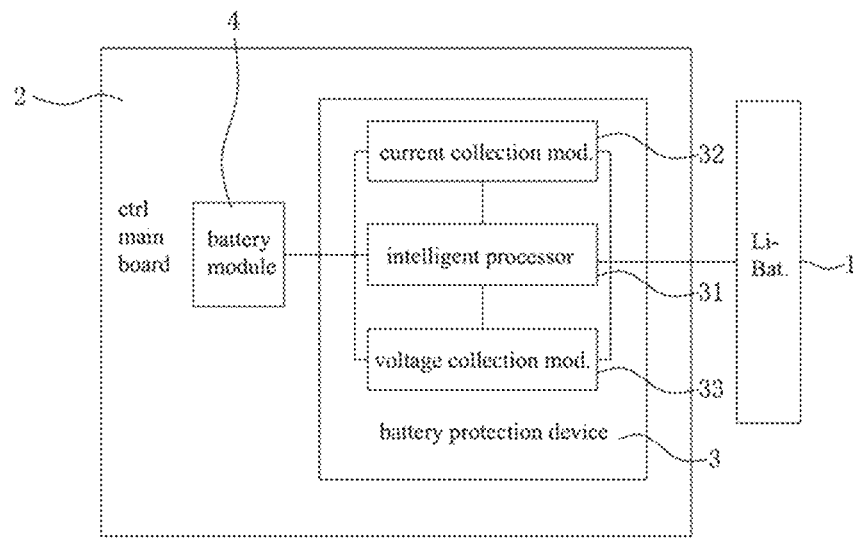
FIG. 25 is a schematic view of a portion of a portable fan according to embodiments of the present disclosure.
Figure 26:
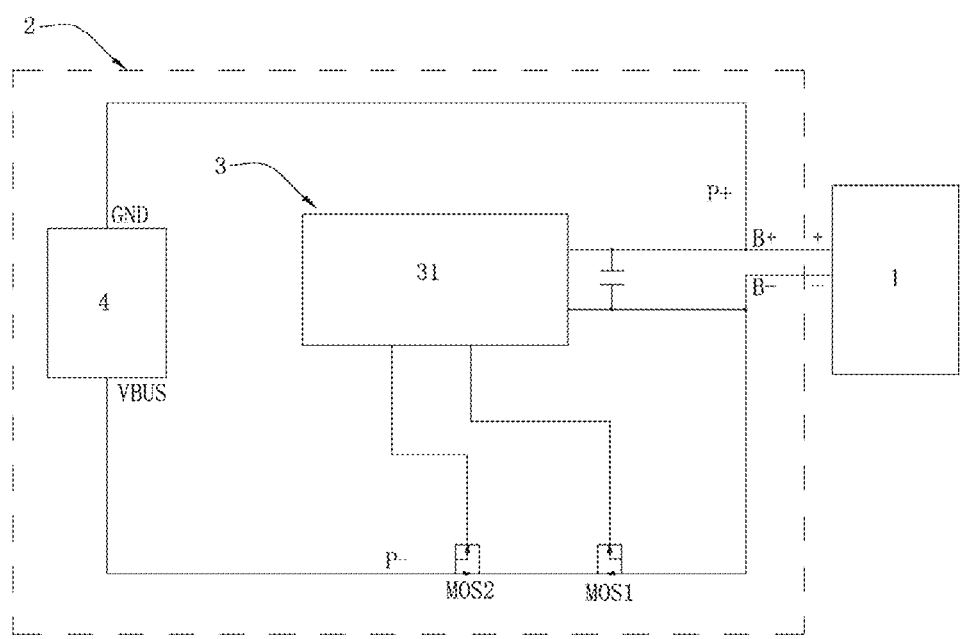
FIG. 26 is a partial circuit diagram view of the portable fan according to the embodiments of the present disclosure.

As shown in FIG. 25 and FIG. 26, a partial schematic view and a partial circuit diagram of the portable fan 100 of a first implementation are shown, where the partial schematic view and the partial circuit diagram are simplified. For example, a drive circuit between the control main board 2 and the fan assembly 6 is omitted. A battery protection device 3 usually includes pins B+, B−, P+ and P−. The battery protection device 3 usually includes an intelligent processor 31, a current collection module 32 and a voltage collection module 33. The intelligent processor 31 is connected to the current collection module 32 and the voltage collection module 33. The intelligent processor 31 may be an IC control chip, or other types of chips that are not limited herein. The voltage collection module 33 operates as follows. The pins B+ and B− of the battery protection device 3 are respectively connected to a positive electrode and a negative electrode of a lithium ion battery 1. In this way, the battery protection device 3 monitors a voltage between the positive electrode and the negative electrode of the lithium ion battery 1. The current collection module 32 operates as follows. A MOS1 and a MOS2 are connected to each other in series on a circuit, such that the MOS1 and the MOS2 monitor a current of the circuit.

The intelligent processor 31 monitors, by the voltage collection module 33 and the current collection module 32, the voltage of the lithium ion battery 1 and the current of the circuit to control the MOS1 and the MOS2 to be on or off. The MOS1 and the MOS2 serve as switches in the circuit to respectively control a charging circuit and a discharging circuit to be conducted or disconnected. During normal operation, when the voltage of the lithium ion battery 1 is within a range of A to B, both the MOS1 and the MOS2 are in an on state. When the intelligent processor 31 determines, based on a monitoring result of the voltage collection module 33, that the voltage of the lithium ion battery 1 reaches a value of B, the intelligent processor 31 controls the MOS1 (the charging circuit) to be off, such that the charging circuit is disconnected, and an external power source cannot charge the lithium ion battery 1. In this way, an overcharging protection is provided. When the intelligent processor 31 determines, based on the monitoring result of the voltage collection module 33, that the voltage of the lithium ion battery 1 is lower than a value of A, the intelligent processor 31 controls the MOS2 (the discharging circuit) to be off, such that the discharging circuit is disconnected, and the lithium ion battery 1 is not discharged to any load. In this way, a discharging protection is provided. During the lithium ion battery 1 being normally discharged to a load, a discharge current passes through the MOS1 and the MOS2 that are connected to each other in series. Due to a conduction impedance of the MOS1 and the MOS2, a voltage is generated at two ends of the MOS1 and the MOS2, and the intelligent processor 31 detects a value of the generated voltage. When the load is abnormal due to some reasons, resulting in the current of the circuit being increased, and when the current of the circuit is increased to enable the voltage between the ends of the MOS1 and the MOS2 to be greater than a value of C, the intelligent processor 31 controls the MOS1 and the MOS2 to be off, such that the discharging circuit is disconnected, the current of the circuit is turned to zero, and therefore, an overcurrent protection is provided. During the lithium ion battery 1 being discharged to the load, when the current of the circuit is increased to enable the voltage between the ends of the MOS1 and the MOS2 to be greater than a value of D (D>C), the intelligent processor 31 determines that the load is short-circuited and controls the MOS2 (the discharging circuit) to be off, such that the discharging is disconnected, and therefore, a short-circuit protection is provided. The current collection module 32 and the voltage collection module 33 are both connected to the lithium ion battery 1 to monitor the current and the voltage of the lithium ion battery 1. Since the intelligent processor 31, the current collection module 32, and the voltage collection module 33 operate together, the lithium ion battery 1 is prevented from overvoltage, undervoltage, overcurrent, and short circuits, such that an operation state of the lithium ion battery 1 is intelligently controlled.

The battery protection device 3 is arranged on the control main board 2. Therefore, when the lithium ion battery 1 needs to be disassembled, the lithium ion battery 1 can be directly removed from the portable fan 100, and another lithium ion battery 1 may be reassembled or replaced. In this way, disassembling and assembling of the battery protection device 3 with the lithium ion battery 1 can be reduced, facilitating inspection and replacement of the lithium ion battery 1.

As shown in FIGS. 25 to 26, the control main board 2 is arranged with a power supply module 4. The pins P− and P+ of the battery protection device 3 are respectively connected to pins of the power supply module 4, such that the current collection module 32 and the voltage collection module 33 are connected to the power supply module 4 to monitor a current and a voltage of the power supply module 4. Specifically, the power supply module 4 includes a charging interface 41, and in the present embodiment, the charging interface 41 is a TYPE-C female port. Of course, in other embodiments, the charging interface 41 may be a port in other connection types. During charging, pins VBUS and GND are respectively connected to the pins P− and P+ of the battery protection device 3, a conducted TYPE-C male terminal is inserted into the charging interface 41 to allow the charging interface 41 to intake power from an external power source. The charging interface 41 supplies power to the battery protection device 3 via the pins VBUS and GND, and the battery protection device 3, after being supplied with the power, charges power to the lithium ion battery via the pins B− and B+. During discharging, the lithium-ion battery 1, after being charged, supplies power to the control board 2 through the pins P− and P+ of the battery protection device 3. Therefore, a wire, which is connected between the lithium ion battery 1 and the control main board 2 for power supplying, can be eliminated. In this way, a circuit configuration of the portable fan 100 is simplified. The control main board 2 is further arranged with a switch 7 and a motor (not shown, the same hereinafter). The switch 7 is exposed outwardly to be operated by the user. Only when the switch 7 is turned on, the lithium ion battery 1 can supply power to the motor of the control main board 2. The motor drives the fan assembly 6 to rotate to activate the portable fan 100, otherwise, the portable fan 100 cannot be activated.

Figure 27:
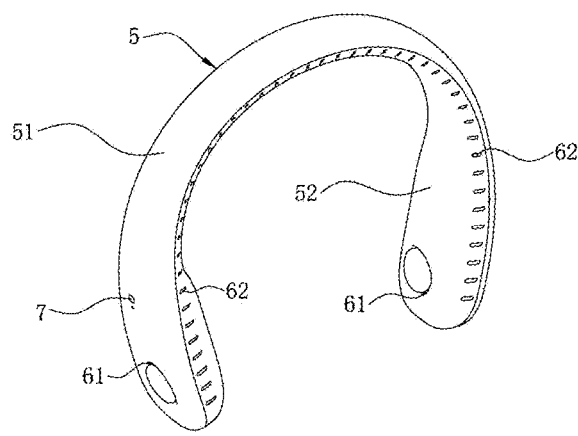
FIG. 27 is a perspective view of the portable fan according to the embodiments of the present disclosure.
Figure 28:
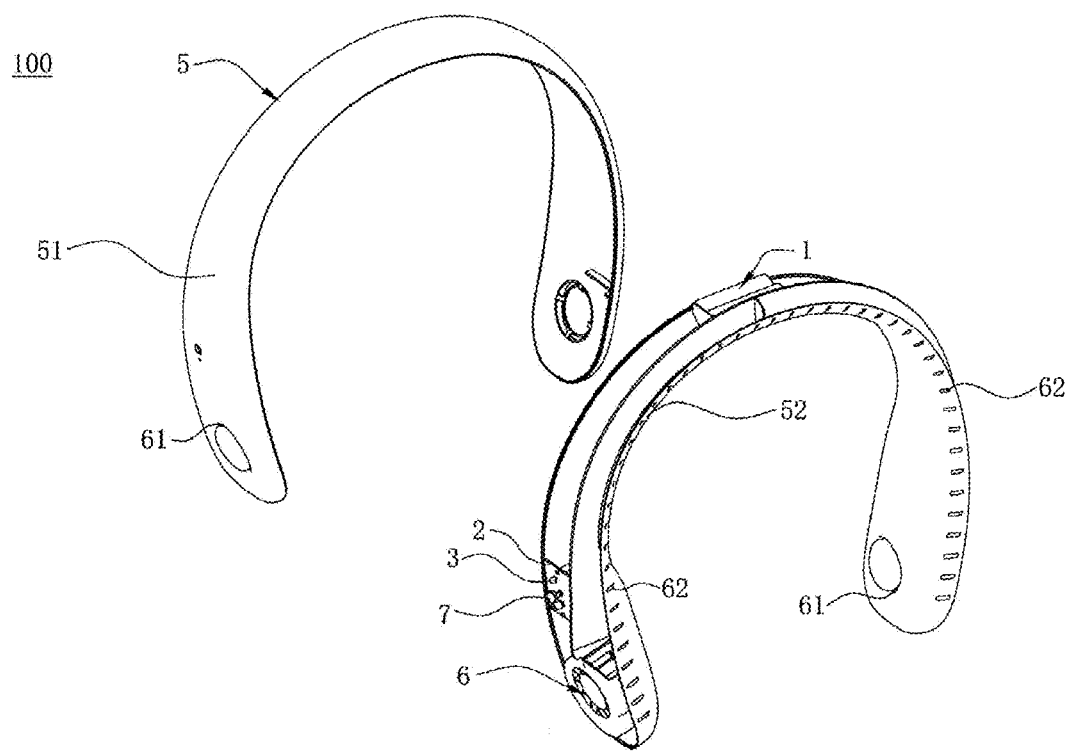
FIG. 28 is an exploded view of a portion of the portable fan shown in FIG. 27.
Figure 29:
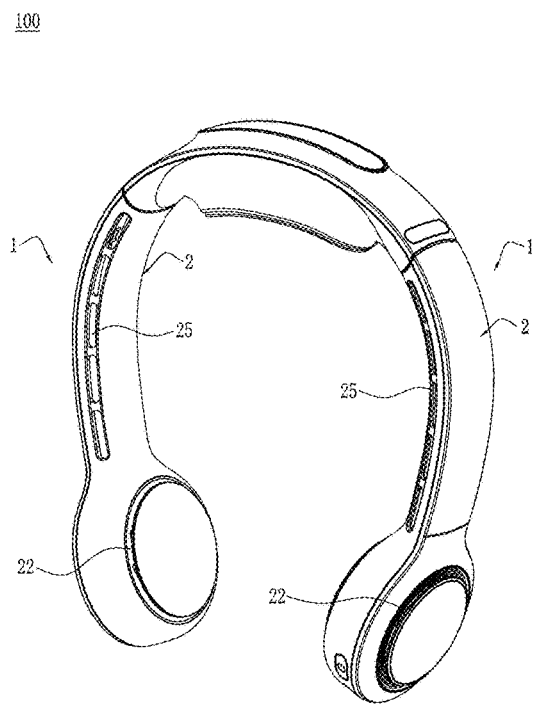
FIG. 29 is a perspective view of a portable fan according to a first implementation of embodiments of the present disclosure.
Figure 30:
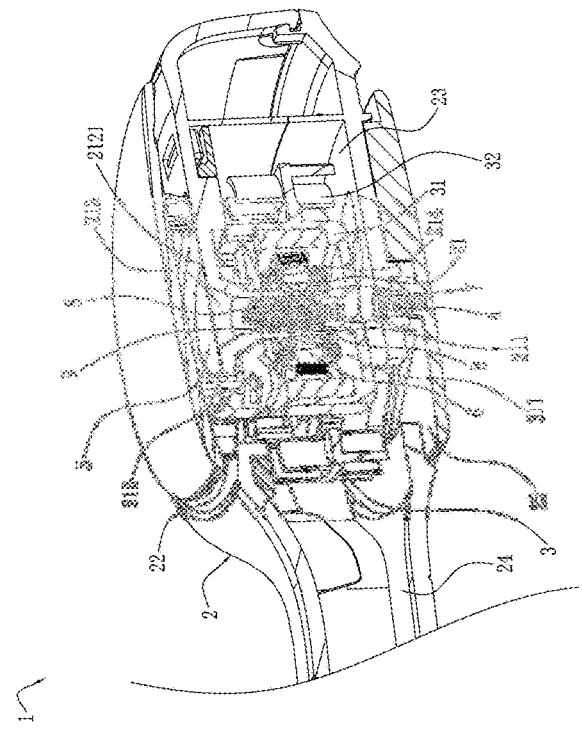
FIG. 30 is a cross-sectional view of a portion of the portable fan shown in FIG. 29.
Figure 31:
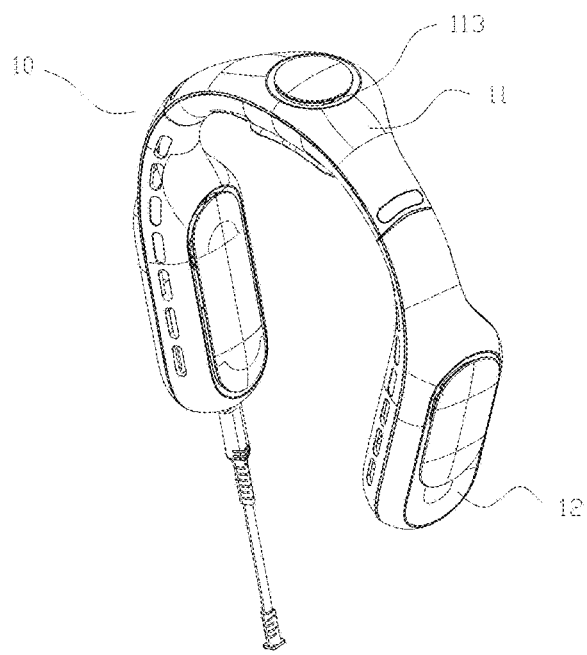
FIG. 31 is a structural schematic view of a fan according to an Embodiment 13 of the present disclosure.
Figure 32:
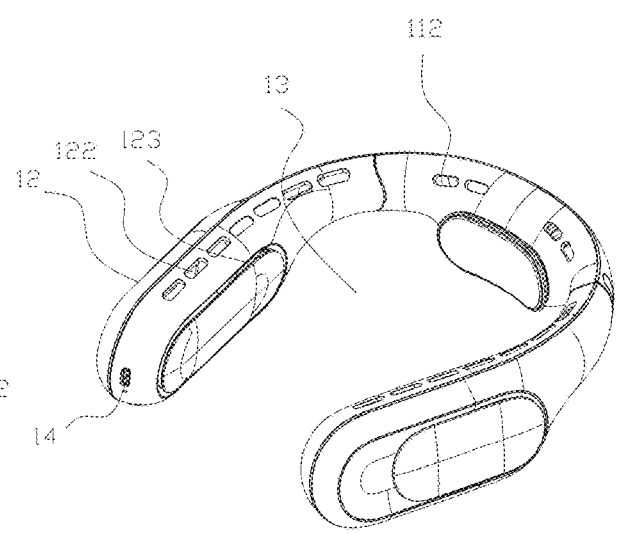
FIG. 32 is a structural schematic view of the fan, being viewed from another viewing angle, according to the Embodiment 13 of the present disclosure.
Figure 33:
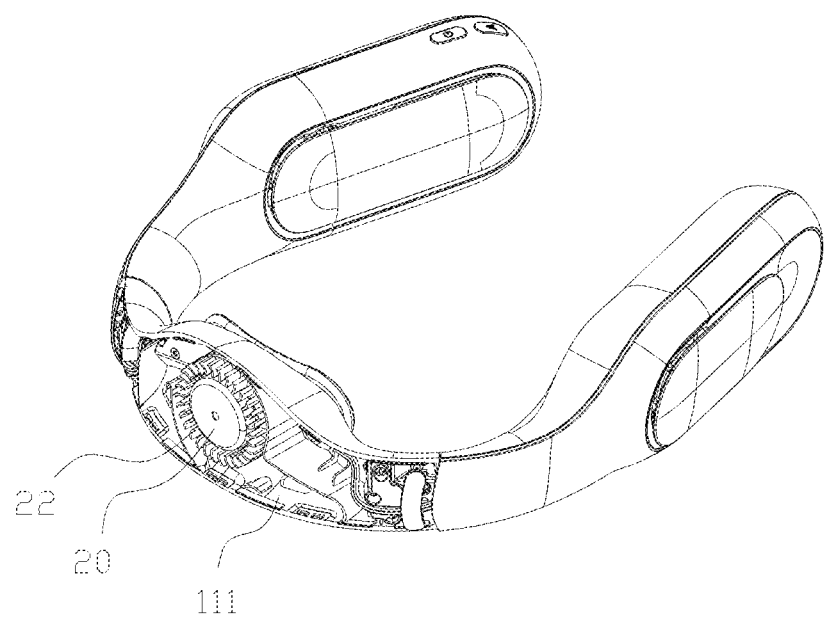
FIG. 33 is a structural schematic view of the fan, having partial elements omitted, according to the Embodiment 13 of the present disclosure.
Figure 34:
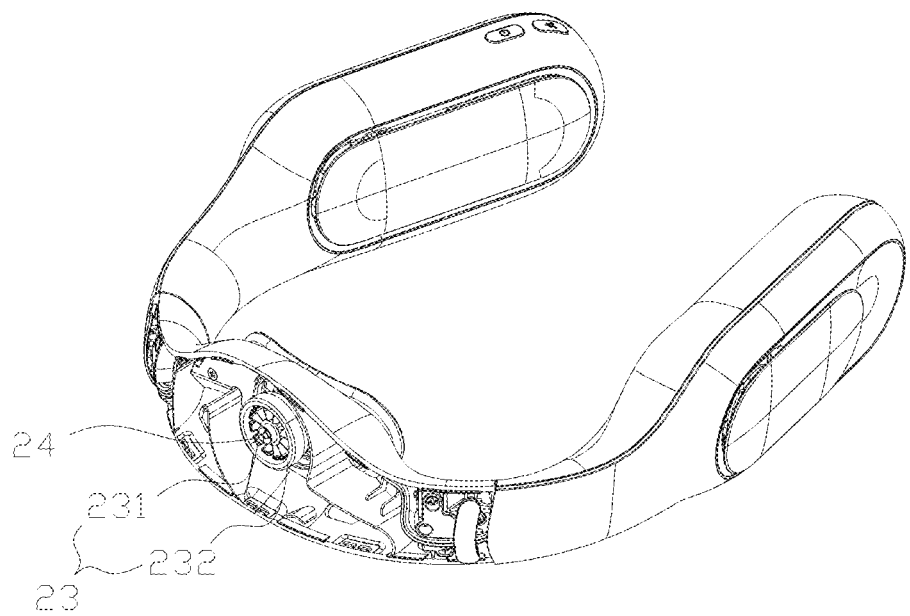
FIG. 34 is a structural schematic view of the fan, having partial elements omitted, according to the Embodiment 13 of the present disclosure.
Figure 38:
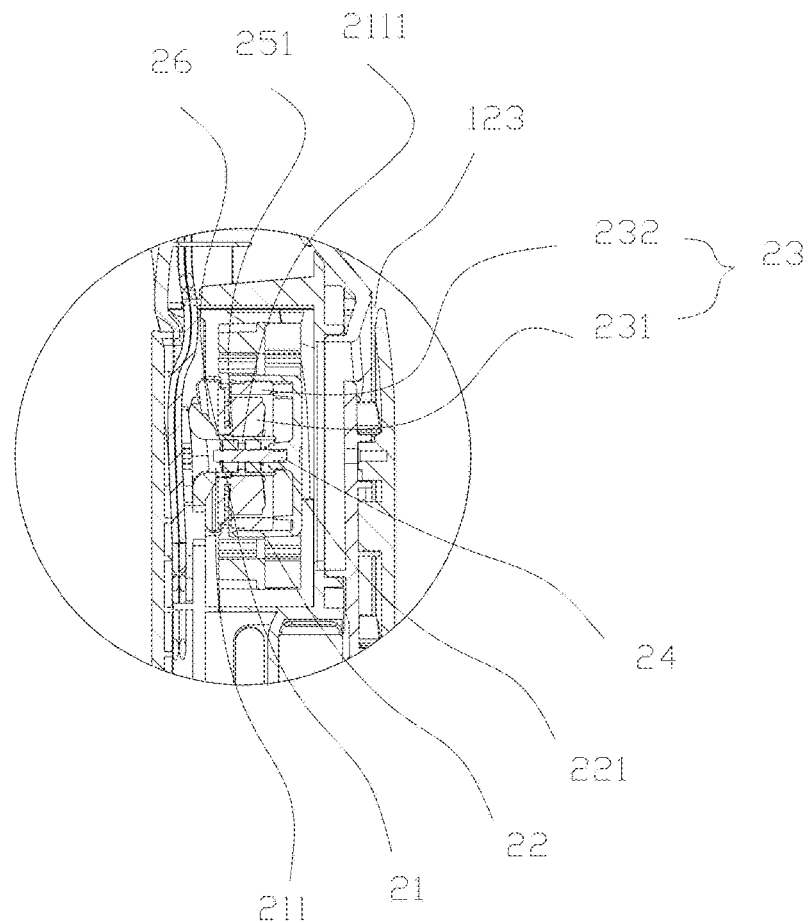
FIG. 38 is an enlarged view of a portion B shown in FIG. 37.
Figure 39:
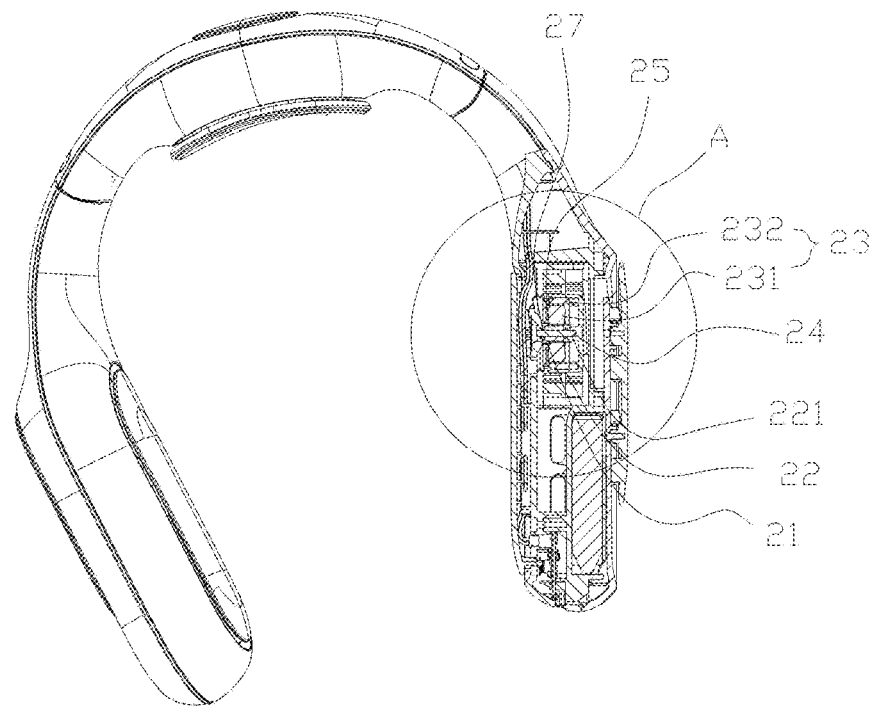
FIG. 39 is a cross-sectional view of a portion of the portable fan according to the Embodiment 13 of the present disclosure.
Figure 40:
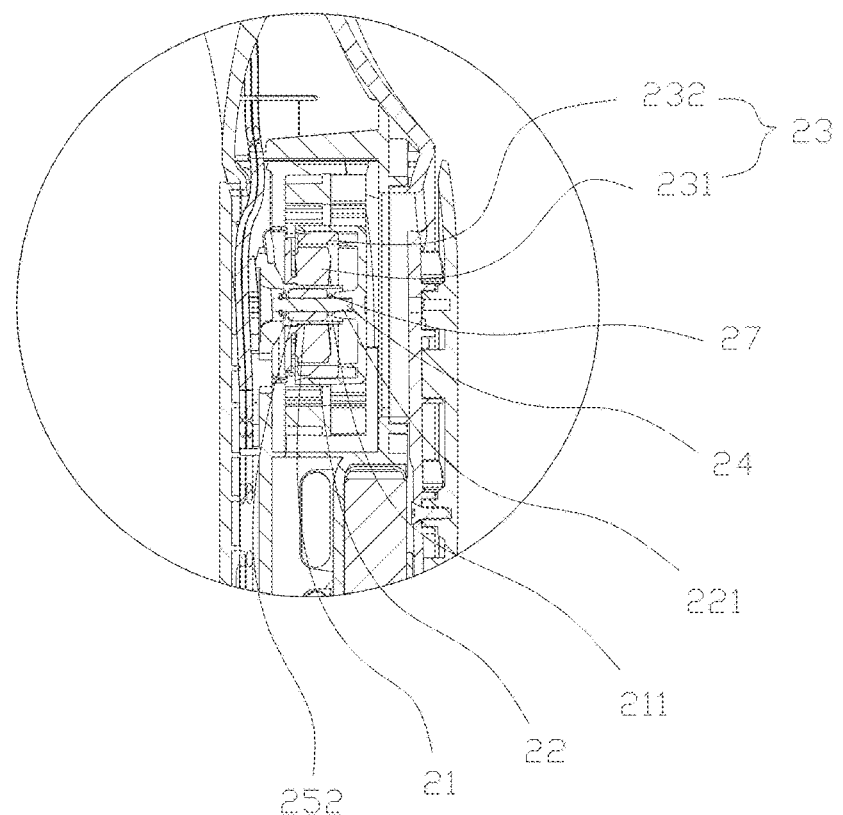
FIG. 40 is an enlarged view of a portion A shown in FIG. 39.
Figure 41:
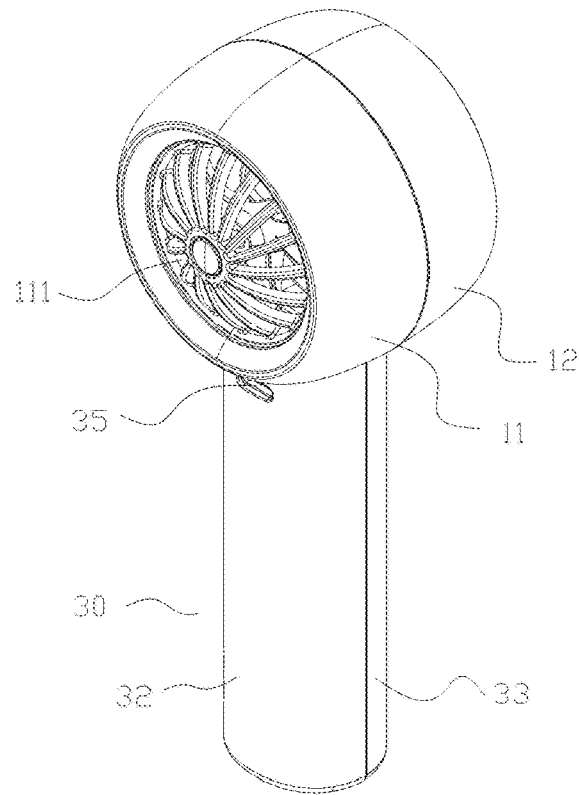
FIG. 41 is a structural schematic view of a fan according to embodiments of the present disclosure.
Figure 42:
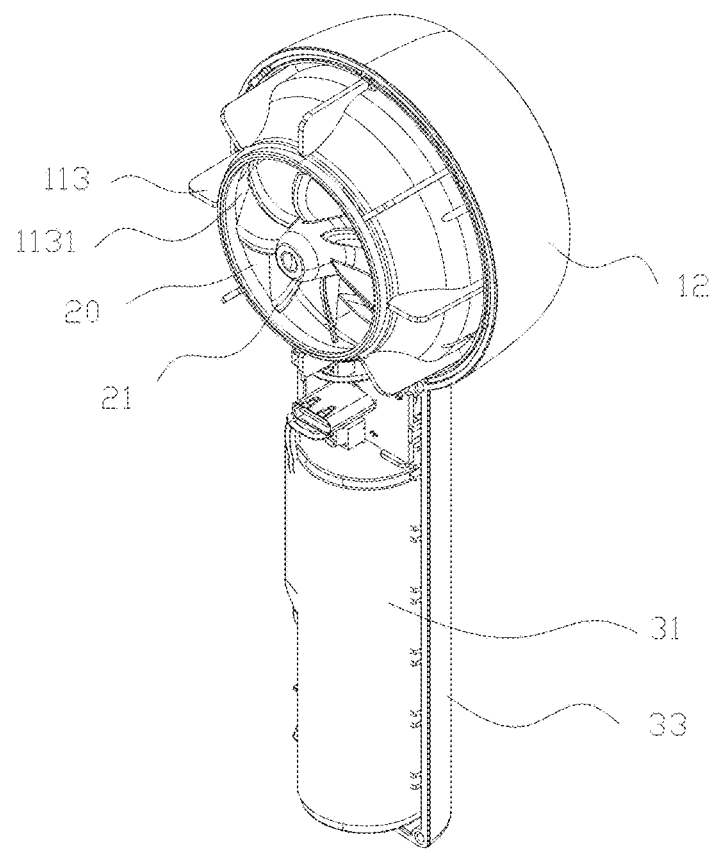
FIG. 42 is a structural schematic view of the fan, having partial structure omitted, according to embodiments of the present disclosure.
Figure 43:
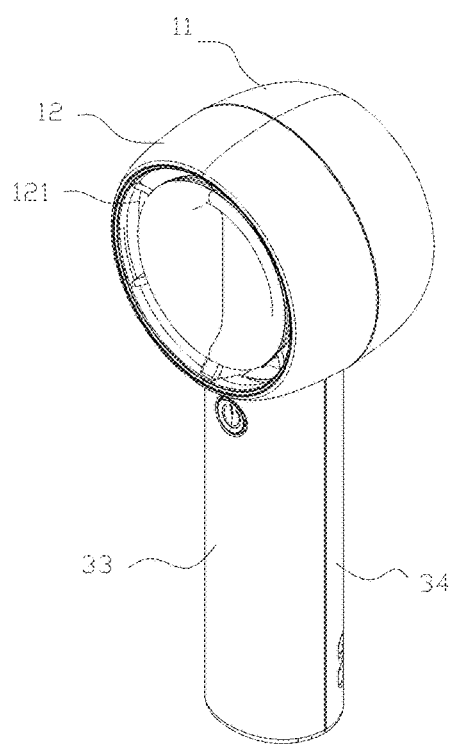
FIG. 43 is a structural schematic view of the fan, being viewed from another viewing angle, according to embodiments of the present disclosure.
Figure 44:
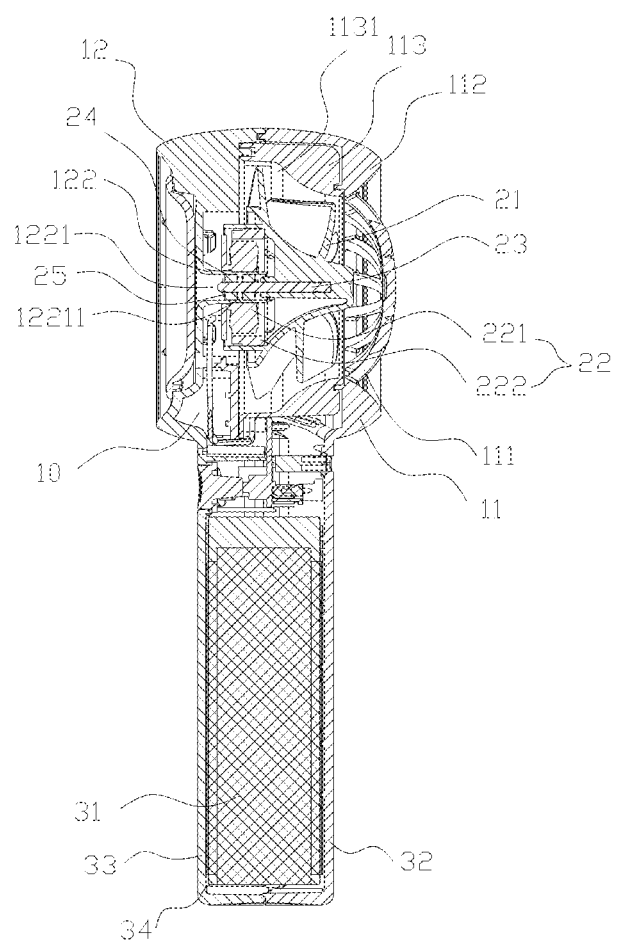
FIG. 44 is a cross-sectional view of the fan according to embodiments of the present disclosure.
Figure 45:
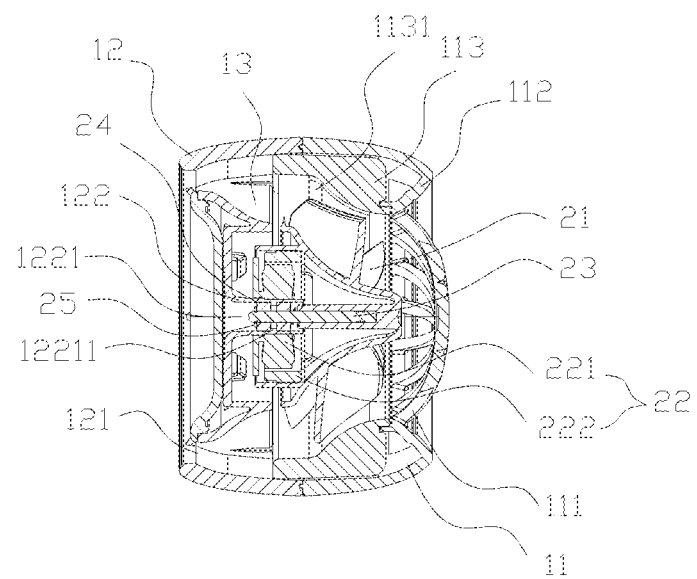
FIG. 45 is a cross-sectional view of the fan, being viewed from another viewing angle, according to embodiments of the present disclosure.
Figure 46:
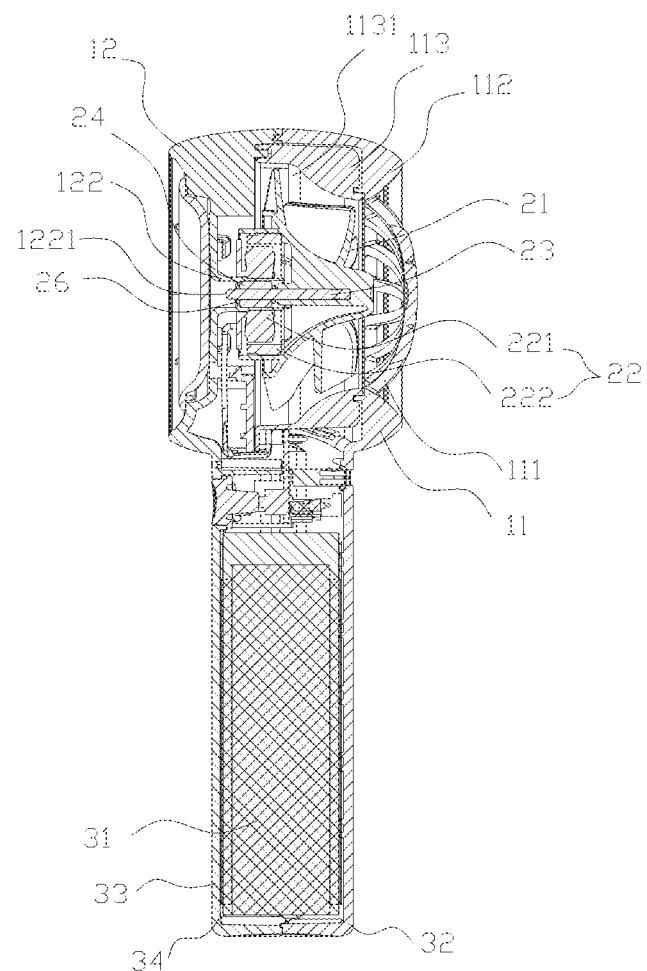
FIG. 46 is a cross-sectional view of the fan according to embodiments of the present disclosure.
Figure 47:
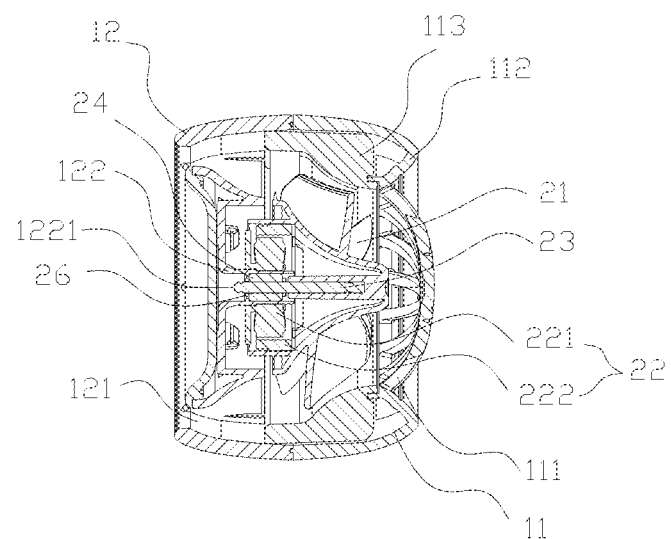
FIG. 47 is a cross-sectional view of the fan, being viewed from another viewing angle, according to embodiments of the present disclosure.

As shown in FIG. 27 and FIG. 28, wires between various components are also omitted in FIG. 28. The portable fan 100 is arranged with a housing 5, a fan assembly 6 arranged inside the housing 5, the lithium-ion battery 1 arranged inside the housing 5, the control main board 2 arranged inside the housing 5, and the battery protection device 3 arranged inside the housing 5. The housing 5 is arranged with an air inlet portion 61 and an air outlet portion 62. The housing 5 includes a first housing 51 and a second housing 52 mated with the first housing 51. The lithium ion battery 1 is configured to supply power to the portable fan 100. The fan assembly 6 rotates to intake air from the air inlet portion 61 and drives the air to be output from the air outlet portion 62. The control main board 2 is configured to control the portable fan 100. The battery protection device 3 is configured to protect the lithium ion battery 1. Further, the power supply module 4 is not shown in FIG. 28. It is to be understood that the power supply module 4 may also be arranged on the control main board 2. Other structures and functions of the present embodiment are the same as those in the first embodiment and will not be repeated herein.

Of course, the portable fan 100 is not limited to a portable fan, and the portable fans 100 applicable in other application scenarios fall within the scope of the present disclosure.

In summary, the portable fan 100 herein has the following beneficial effects:

The battery protection device 3 is arranged on the control main board 2, such that the lithium ion battery 1 can be directly removed from the portable fan 100 when the lithium ion battery 1 needs to be disassembled, and then another lithium ion battery 1 can be reassembled or replaced. Disassembling and assembling of the battery protection device 3 with the lithium ion battery 1 can be reduced, facilitating inspection and replacement of the lithium ion battery 1.

When the battery protection device 3 is electrically connected to the control main board 2, the battery protection device 3 may be integrated in the control main board 2, the wire between the battery protection device 3 and the control main board 2 can be eliminated, and space utilization is improved.

After charging, the lithium ion battery 1 supplies power to the control main board 2 through the pins P− and P+ of the battery protection device 3. Any wire, which is connected between the lithium ion battery 1 and the control main board 2 for power supplying, can be eliminated. In this way, a circuit configuration of the portable fan 100 is simplified.

A technical solution 4 is shown in FIGS. 41 to 47.

As shown in FIG. 41 to FIGS. 47, in order to solve the above problem, the present disclosure provides a portable fan, including: an air duct portion 10, an airflow portion 20, a handheld portion 30. The air duct portion 10 includes a body portion, the body portion defines an air guiding cavity 13. The air duct portion 10 defines an air outlet 121 and an air inlet 111 respectively at two opposite ends thereof. The air outlet 121 and the air inlet 111 are both communicated to the air guiding cavity 13. A positioning protruding post 122 is arranged inside the body portion. The airflow portion includes rotation air blades 21 and a drive portion 22 that is drivably connected to the rotation air blades 21. The rotation air blades 21 are rotatably received in the air guiding cavity 13 and are arranged facing towards the air outlet 121. The drive portion 22 includes a stator 221 and a rotor 222 sleeving an outside of the stator 221. The rotor 222 is fixedly mounted on the rotation air blades 21 and is coaxially arranged with the rotation air blades 21. The stator 221 fixedly sleeves the positioning protruding post 122. The handheld portion 30 is connected to the air duct portion 10. The handheld portion 30 defines a mounting cavity 34. A power supply assembly 31 is received in the mounting cavity 34. The power supply assembly 31 is electrically connected to the drive portion 22. For the portable fan in the present embodiment, the drive portion 22, which is driveably connected to the rotation air blades 21, is configured as the stator 221 and the rotor 222 sleeving the outside of the stator 221. The rotor 222 is fixedly mounted on the rotation air blades 21 and is coaxially arranged with the rotation air blades 21. In addition, the stator 221 fixedly sleeves the positioning protruding post 122. In this way, a driving force generated by the drive portion 22 can be directly transmitted to the rotation air blades 21 through the rotor 222, a transmission member between the drive portion 22 and the rotation air blades 21 can be omitted. a transmission efficiency of the portable fan is improved.

In an embodiment, the power supply assembly 31 is a storage battery.

As shown in FIGS. 1 and 5, in an embodiment, the body portion includes a first housing 11 and a second housing 12 connected to the first housing 11. The air guiding cavity 13 is formed between the first housing 11 and the second housing 12. The first housing 11 defines the air inlet 111, the second housing 12 defines the air outlet 121. The positioning protruding post 122 is arranged on the second housing 12 and extends along an extension direction of the air guiding cavity 13.

As shown in FIGS. 4 to 7, in an embodiment, the rotation air blades 21 defines a fixation hole, an axis of the fixation hole coincides with an axis of the rotation air blades 21. The airflow portion 20 further includes a rotation shaft 23. A first end of the rotation shaft 23 is fixedly received in the fixation hole. A positioning hole 1221 is defined inside the positioning protruding post 122. An axis of the positioning hole 1221 coincides with an axis of the rotation shaft 23. A second end of the rotation shaft 23 is rotatably received in the positioning hole 1221.

As shown in FIGS. 4 to 7, in order to improve the service life of the portable fan provided in the present embodiment, the airflow portion 20 further includes a bearing portion 24. An outer ring of the bearing portion 24 is fixed in the positioning hole 1221, and an inner ring of the bearing portion 24 sleeves the second end of the rotation shaft 23. By disposing the bearing portion 24 between the positioning hole 1221 and the rotation shaft 23, and by receiving the outer ring of the bearing portion 24 in the positioning hole 1221 and arranging the inner ring to sleeve the second end of the rotation shaft 23, direct friction between the positioning hole 1221 and the rotation shaft 23 can be avoided, such that the service life of the portable fan is effectively improved.

As shown in FIGS. 4 and 5, in an embodiment, the bearing portion 24 includes a rolling bearing, and the airflow portion 20 further includes a limiting member 25. The limiting member 25 is mounted at the second end of the rotation shaft 23. The bearing portion 24 is disposed between the limiting member 25 and the first end of the rotation shaft 23. By arranging the limiting member 25 on the second end of the rotation shaft 23, a radial movement of the rolling bearing can be effectively limited.

As shown in FIGS. 4 and 5, in an embodiment, in order to facilitate mounting of the rolling bearing, a plurality of bearing portions 24 are arranged. An inner flange 12211 is arranged on an inner wall of the positioning hole 1221. The inner flange 12211 is disposed between two adjacent bearing portions 24 to enable the two adjacent bearing portions 24 to be spaced apart from each other. By arranging the limiting member 25 on the second end of the rotation shaft 23, the inner ring of the rolling bearing can be effectively limited. By arranging the inner flange 12211 on the inner wall of the positioning hole 1221, the outer ring of the bearing can be effectively limited. In this way, the rolling bearing can be mounted effectively.

In an embodiment, the bearing portion 24 is a ball bearing, and a lubricant is provided in the ball bearing.

In an embodiment, the bearing portion 24 is a ceramic bearing, and a lubricant is provided in the ceramic bearing.

In an embodiment, the bearing portion 24 is a magnetic levitation bearing.

In an embodiment, the airflow portion 20 further includes an elastic member, the elastic member sleeves the rotation shaft 23. Two ends of the elastic member respectively abut against the inner ring of the rolling bearing and the rotation air blades 21. The elastic member applies an elastic force on the inner ring of the rolling bearing in a direction away from the air inlet 111. By arranging the elastic member, the rolling bearing can be pre-tensioned, and the service life of the rolling bearing is effectively improved.

As shown in FIGS. 6 and 7, in an embodiment, in order to improve the service life of the portable fan of the present embodiment, the bearing portion 24 includes a slide bearing. The airflow portion 20 further includes two sealing rings 26. The two sealing rings 26 both sleeve the rotation shaft 23 and are respectively located on two sides of the slide bearing. By arranging the slide bearing between the rotation shaft 23 and the positioning hole, and by arranging the inner ring of the slide bearing to be fixedly connected to the second end of the rotation shaft 23 and arranging the outer ring to be fixedly connected to the fixation hole, friction between the rotation shaft 23 and the positioning hole 1221 can be converted into friction between the inner ring and the outer ring of the slide bearing. In this way, the friction between the rotation shaft 23 and the positioning hole 1221 is avoided, and the service life of the portable fan is effectively improved.

As shown in FIGS. 4 to 7, in an embodiment, the handheld portion 30 includes a third housing 32 and a fourth housing 33 connected to the third housing 32. The mounting cavity 34 is formed between the third housing 32 and the fourth housing 33.

As shown in FIGS. 4 to 7, in an embodiment, the first housing 11 includes a housing body 112 and an air duct liner 113. The air duct liner 113 is mounted on the housing body 112. The air duct 1131 is defined inside the air duct liner 113. The air guiding cavity 13 is formed between the air duct liner 113 and the second housing 12.

Since a single-phase motor is inexpensive, most of small-sized handheld portable fans on the market are driven by single-phase motors. However, since the single-phase motor has a low rotational speed, a strong airflow cannot be provided, and a poor user experience is provided. In order to enable the small-sized handheld portable fan to provide stronger airflow, a high-speed motor needs to be arranged for driving. However, the high-speed motor occupies a large space, and the portable fan may be worn and torn.

In order to solve the above problem, the drive portion 22 is a three-phase motor. Since the drive portion 22 is the three-phase motor, a rotation speed of the rotation air blades 21 can be effectively increased, and the portable fan in this embodiment can provide a stronger airflow, the user experience is improved. In addition, due to the high rotation speed of the three-phase motor, in order to avoid sharp wear between the rotation shaft and the positioning hole due to the high-speed rotation and to ensure the service life of the portable fan, in the portable fan of the present embodiment, a bearing portion is disposed between the positioning hole and the rotation shaft. The bearing portion enables the friction between the positioning hole and the rotation shaft to be converted from sliding friction to rolling friction inside the bearing portion, such that wear and tear between the positioning hole and the rotation shaft can be avoided, the service life of the portable fan is effectively improved.

As shown in FIGS. 1 to 7, in an embodiment, the handheld portion 30 is arranged with a charging port 35. The charging port 35 is electrically connected to the power supply assembly 31. By arranging the charging port 35 on the handheld portion 30 and enabling the charging port 35 to be electrically connected to the power supply assembly 31, the power supply assembly 31 can be electrically connected to an external power supply through the charging port 35, such that an operating endurance of the portable fan is ensured.

In an embodiment, a discharging port is arranged on the handheld portion that is electrically connected to the power supply assembly. The discharging port is electrically connected to an external electronic device. The discharging port enables electric power to be transmitted from the power supply assembly to the external electronic device.

In an embodiment, the air inlet is arranged with a grill assembly. The grill assembly includes a first grill member and a second grill member. The first grill member is fixedly connected to the first housing. The second grill member is pivotally connected to the first grill member. The first grill member defines a plurality of first openings. The second grill member defines a plurality of second openings. The plurality of first openings and the plurality of second openings are in one-to-one correspondence with each other. The second grill member has a shielding state that completely shields the first openings and an open state in which the first openings and the second openings overlap with each other. By rotating the second grill member, the second grill member can be switched between the shielding state and the open state. The grill assembly provided in this embodiment can effectively adjust the amount of air intaken from the air inlet, such that the user experience is effectively improved.

In an embodiment, the air duct portion 10 and the handheld portion 30 are fixedly connected to each other. Of course, in other embodiments, the air duct portion 10 and the handheld portion 30 may be pivotally connected to each other.

In an embodiment, the third housing 32 and the first housing 11 are integrally molded to form a one-piece structure, and the fourth housing 33 and the second housing 12 are integrally molded to form a one-piece structure In another embodiment, the third housing 32 is pivotally connected to the first housing 11, and the fourth housing 33 is pivotally connected to the second housing 12. A pivot shaft between the third housing 32 and the first housing 11 is coaxial with a pivot shaft of the fourth housing 33 and the second housing 12.

In summary, the portable fan provided in the present embodiment has at least the following beneficial technical effect. The drive portion 22, which is driveably connected to the rotation air blades 21, is configured as the stator 221 and the rotor 222 sleeving the outside of the stator 221. The rotor 222 is fixedly mounted on the rotation air blades 21 and is coaxially arranged with the rotation air blades 21. In addition, the stator 221 fixedly sleeves the positioning protruding post 122. In this way, the driving force generated by the drive portion 22 can be directly transmitted to the rotation air blades 21 through the rotor 222, the transmission device between the drive portion 22 and the rotation air blades 21 is omitted, such that the transmission efficiency of the portable fan is improved.

What is claimed is:

1. A portable fan, comprising a fan and a power supply drive assembly electrically connected to the fan; wherein the power supply drive assembly comprises a battery and a fan drive circuit electrically connected to the battery; the fan drive circuit comprises:
   a master control circuit;
   a three-phase drive circuit, comprising at least three signal input ends and three drive signal output ends; wherein each of the at least three signal input ends is electrically connected to the master control circuit to receive control signals; each of the three drive signal output ends is electrically connect to a respective one of three signal ends of a direct-current (DC) brushless fan motor to respectively output a three-phase drive signal to drive the DC brushless fan motor to rotate; and
   an inverted-phase electric potential detection circuit, comprising three detection branches; wherein each of the three detection branches comprises a detection end and a detection output end electrically connected to the detection end; three detection ends of the three detection branches are respectively electrically connected to the three drive signal output ends; three detection output ends of the three detection branches are electrically connected to the master control circuit to respectively output a first detection signal, a second detection signal, and a third detection signal; the master control circuit is informed of a phase of the three-phase drive signal based on the first detection signal, the second detection signal, and the third detection signal to adjust the control signals;
   wherein the battery is configured to supply power to the fan drive circuit;
   wherein, the three-phase drive circuit comprises a first transistor, a second transistor, a third transistor, a fourth transistor, a fifth transistor, a sixth transistor, a seventh transistor, an eighth transistor, and a ninth transistor; a first conductive end of the first transistor, a first conductive end of the second transistor, and a first conductive end of the third transistor are connected to a power supply end; a first conductive end of the fourth transistor is connected to the power supply end; a first conductive end of the fifth transistor is connected to the power supply end; a first conduction end of the sixth transistor is connected to the power supply end; a control end of the fourth transistor, a control end of the fifth transistor, and a control end of the sixth transistor are electrically connected to the master control circuit, a control end of the seventh transistor is electrically connected to the control end of the fourth transistor, a control end of the eighth transistor is electrically connected to the control end of the fifth transistor, and a control end of the ninth transistor is electrically connected to the control end of the sixth transistor, so as to receive the control signals; second conduction ends of the fourth transistor, the fifth transistor, and the sixth transistor are grounded; a first conductive end of the seventh transistor is connected to a second conductive end of the first transistor; a second conductive end of the seventh transistor is grounded; a first conductive end of the eighth transistor is connected to a second conductive end of the second transistor; a second conductive end of the eighth transistor is grounded; a first conductive end of the ninth transistor is connected to the second conductive end of the third transistor; a second conductive end of the ninth transistor is grounded; a node between the first conductive of the seventh transistor and the second conductive of the first transistor, a node between the first conductive of the eighth transistor and the second conductive of the second transistor, and a node between the first conductive of the ninth transistor and the second conductive of the third transistor respectively serve as the three drive signal output ends;
the at least three signal input ends are three PWM signal input ends; the control signals comprise three PWM signals; and the fan drive circuit further comprises a current detection circuit; the second conductive ends of the seventh transistor, the eighth transistor, and the ninth transistor are all grounded via the current detection circuit; the current detection circuit is electrically connected to the master control circuit; the current detection circuit comprises a sense resistor and a sense capacitor; the second conductive ends of the seventh transistor, the eighth transistor, and the ninth transistor are grounded via the sense resistor and the sense capacitor sequentially; a node between the sense resistor and the sense capacitor is electrically connected to the master control circuit.

2. The portable fan according to claim 1, wherein, the detection branch comprises a first detection resistor, a second detection resistor, and a third detection resistor; the first detection resistor and the second detection resistor are connected to each other in series; an end of the first detection resistor away from the second detection resistor is the detection end, and an end of the second detection resistor away from the first detection resistor is grounded; a node between the first detection resistor and the second detection resistor is the detection output end.

3. The portable fan according to claim 1, wherein, the battery is a lithium-ion battery; the portable fan further comprises:
   a control main board, configured to control the portable fan;
   a battery protection device, arranged on the control main board and electrically connected to the control main board;
   wherein, the battery protection device is electrically connected to the control main board, and pins B+ and B− of the battery protection device are respectively connected to a positive electrode and a negative electrode of the lithium-ion battery.

4. The portable fan according to claim 3, wherein, the battery protection device is integrally arranged with the control main board.

5. The portable fan according to claim 3, wherein the battery protection device comprises an intelligent processor, a current collection module and a voltage collection module; the intelligent processor is connected to the current collection module and the voltage collection module; the current collection module and the voltage collection module are connected to a power supply module.

6. The portable fan according to claim 5, wherein the power supply module is provided in the control main board, and the pins P+ and P− of the battery protection device are respectively connected to pins of the power supply module.

7. The portable fan according to claim 1, wherein, the portable fan is configured to be worn to a neck of a user.

8. The portable fan according to claim 1, comprising a handheld portion and an airflow portion connected to the handheld portion; wherein the handheld portion is configured to be held by a hand of a user; and the power supply drive assembly and the fan are arranged inside the airflow portion.

9. The portable fan according to claim 7, comprising:
a neck housing, defining a neck space, wherein the neck housing is configured to be worn to a neck of a user, and the neck is configured to be received in the neck space;
an airflow portion, arranged inside the neck housing and configured to blow an airflow towards the neck space; wherein the airflow portion comprises rotation air blades and a three-phase motor drive assembly driveably connected to the rotation air blades to drive the rotation air blades to rotate to generate the airflow.

10. The portable fan according to claim 9, wherein,
the airflow portion further comprises a positioning protruding post;
the three-phase motor drive assembly comprises a stator and a rotor sleeving an outside of the stator; the rotor is fixedly mounted on the rotation air blades and is coaxially arranged with the rotation air blades; the stator fixedly sleeves the positioning protruding post.

11. The portable fan according to claim 10, wherein the neck housing comprises a connection section and two neck side sections respectively connected to two sides of the connection section; each of the connection section and/or at least one of the two neck side sections is arranged with one respective airflow portion.

12. The portable fan according to claim 11, wherein the connection section is arranged with the respective one airflow portion; the connection section defines a first air guiding cavity therein; the connection section defines a first air outlet communicated with the first air guiding cavity; the first air outlet faces towards the neck space; the positioning protruding post is received in the first air guiding cavity; the rotation air blades are rotatably received in the first air guiding cavity and configured to blow the airflow to the first air outlet.

13. The portable fan according to claim 12, wherein the rotation air blades defines a fixation hole, and an axis of the fixation hole coincides with an axis of the rotation air blades; the airflow portion further comprises a rotation shaft; a first end of the rotation shaft fixedly extends into the fixation hole; the positioning protruding post defines a positioning hole; an axis of the positioning hole coincides with an axis of the rotation shaft; a second end of the rotation shaft is rotatably received in the positioning hole.

14. The portable fan according to claim 12, wherein a plurality of first air guiding ribs are arranged in the connection section; the plurality of first air guiding ribs cooperatively define the first air guiding cavity; the first air outlet comprises a plurality of first air outlets; the plurality of first air outlets are spaced apart from each other and are located along an extension direction of the connection section; an end of the first air guiding cavity is communicated with the plurality of first air outlets.

15. The portable fan according to claim 8, comprising:
an air duct portion, comprising a body portion, wherein the body portion defines an air guiding cavity therein; the air duct portion defines an air outlet and an air inlet respectively at opposite ends thereof; the air outlet and the air inlet are communicated to the air guiding cavity, and a positioning protruding post is arranged inside the body portion;
wherein the airflow portion comprises rotation air blades and a drive portion that is driveably connected to the rotation air blades, wherein the rotation air blades are rotatably received in the air guiding cavity and are arranged facing towards the air outlet; the drive portion comprises a stator and a rotor sleeving an outside of the stator; the rotor is fixedly mounted on the rotation air blades and is coaxially arranged with the rotation air blades; the stator fixedly sleeves the positioning protruding post; the drive portion is a three-phase motor;
wherein the handheld portion is connected to the air duct portion, wherein the handheld portion defines a mounting cavity; a power supply assembly is received in the mounting cavity; and the power supply assembly is electrically connected to the three-phase motor.

16. The portable fan according to claim 15, wherein,
the body portion comprises a first housing and a second housing connected to the first housing; the air guiding cavity is formed between the first housing and the second housing; the first housing defines the air inlet; the second housing defines the air outlet; the positioning protruding post is arranged on the second housing and extends along an extension direction of the air guiding cavity.

17. The portable fan according to claim 15, wherein, the rotation air blades defines a fixation hole, an axis of the fixation hole coincides with an axis of the rotation air blades; the airflow portion further comprises a rotation shaft; a first end of the rotation shaft is fixedly received in the fixation hole; a positioning hole is defined inside the positioning protruding post; an axis of the positioning hole coincides with an axis of the rotation shaft; a second end of the rotation shaft is rotatably received in the positioning hole.

18. The portable fan according to claim 17, wherein the airflow portion further comprises a bearing portion; an outer ring of the bearing portion is fixed in the positioning hole; and an inner ring of the bearing portion sleeves the second end of the rotation shaft.

* * * * *